United States Patent
Ohkura et al.

(10) Patent No.: US 6,182,448 B1
(45) Date of Patent: Feb. 6, 2001

(54) SPEED CHANGING DEVICE FOR HYDRAULIC DRIVING APPARATUS AND SPEED CHANGE CONTROL METHOD THEREOF

(75) Inventors: Yasunori Ohkura, Kawasaki; Hikosaburo Hiraki, Oyama; Noboru Kanayama, Ninomiya-machi; Ryutaro Makida, Kawasaki, all of (JP)

(73) Assignee: Komatsu Ltd., Tokyo (JP)

( * ) Notice: Under 35 U.S.C. 154(b), the term of this patent shall be extended for 0 days.

(21) Appl. No.: 08/793,959

(22) PCT Filed: Sep. 6, 1995

(86) PCT No.: PCT/JP95/01768

§ 371 Date: Mar. 7, 1997

§ 102(e) Date: Mar. 7, 1997

(87) PCT Pub. No.: WO96/07304

PCT Pub. Date: Mar. 14, 1996

(30) Foreign Application Priority Data

Sep. 9, 1994  (JP) .................................................. 6-242173

(51) Int. Cl.⁷ .................................................. F16D 31/02
(52) U.S. Cl. .................................. 60/445; 60/327; 60/494
(58) Field of Search .............................. 60/327, 445, 446, 60/448, 451, 487, 489, 490, 494, 468

(56) References Cited

U.S. PATENT DOCUMENTS

| 3,903,756 | * | 9/1975 | Hamma | 60/449 X |
| 4,481,770 | * | 11/1984 | Lohbauer et al. | 60/445 X |
| 4,694,647 | * | 9/1987 | Yoshida | 60/468 X |
| 5,177,964 | * | 1/1993 | Tanaka et al. | 60/445 |
| 5,184,466 | * | 2/1993 | Schniederjan et al. | 60/448 |
| 5,442,912 | * | 8/1995 | Hirata et al. | 60/468 X |
| 5,553,453 | * | 9/1996 | Coutant et al. | 60/448 X |

FOREIGN PATENT DOCUMENTS

| 63-235730 | 9/1988 | (JP) . |
| 3-22329 | 3/1991 | (JP) . |
| 6-193730 | 7/1994 | (JP) . |
| 6-201019 | 7/1994 | (JP) . |

\* cited by examiner

Primary Examiner—John E. Ryznic
(74) Attorney, Agent, or Firm—Sidley & Austin

(57) ABSTRACT

The present invention relates to a speed changing device for a hydraulic driving apparatus and a speed change control method thereof, which provide excellent controllability, traveling efficiency, and reliability without occurrence of cavitation. To this end, the device comprises a shifter selected position sensor (63a) for detecting a shift lever change, a motor rotational speed sensor (52) for detecting a rotational speed of a hydraulic motor (50), and a control device (60); and the control device (60) judges and controls either a powering control or a brake control, based on the change of the shift lever selection and on the comparison of the detected motor rotational speed with a memorized motor rotational speed. In addition, a two-stage back pressure valve (23) can be provided between a directional control valve (21) and an oil tank.

13 Claims, 15 Drawing Sheets

SPEED CHANGING DEVICE FOR HYDRAULIC DRIVING APPARATUS AND SPEED CHANGE CONTROL METHOD THEREOF

TECHNICAL FIELD

The present invention relates to a speed changing device for a hydraulic driving apparatus and a speed change control method thereof, and more particularly, to a speed changing device for a hydraulic driving apparatus for use in construction vehicles, agricultural machinery, automobiles, etc., and a speed change control method thereof.

BACKGROUND ART

Hitherto, various types of power transmission devices for use in construction vehicles, agricultural machinery, automobiles, etc., such as of mechanical type, hydraulic type, and electric type, have been proposed and used. Regarding small vehicles for construction equipment, those of hydraulic type have been used relatively often. This is because those of hydraulic type can change their running speed from zero to infinity, and a merit of excellent operability has been highly regarded. On the other hand, those of hydraulic type have disadvantages of lower efficiency and higher cost as compared to those of mechanical type. However, operating machines for digging, earth moving, etc., are mounted in construction equipment such as a wheel hydraulic excavator, and all power from an engine is converted by a hydraulic pump in order to actuate the operating machine, so that the use of hydraulic driving apparatuses may becomes less expensive conversely.

In addition, the above-described hydraulic driving apparatuses include two types: the closed circuit and the open circuit. Since they have different characteristics, they are selected for use in accordance with the purpose. For example, in construction equipment, which is used mainly for the purpose of traveling when large amounts of flowing oil pressure are required, those of the open circuit type are used. Recently, closed center load sensing circuits have been used in operating machines in terms of improvement in operability, and closed center valves are adopted therein. Incidentally, when traveling efficiency or controllability is emphasized, those of closed circuit type are used.

Further, a prior art using a counterbalance valve comprises, as shown in FIG. 14, a variable displacement hydraulic pump 210 driven by a driving source 1 such as an engine; a capacity control device 211 for controlling the capacity of the hydraulic pump 210; a forward-reverse directional control valve 212; solenoid operated proportional valve 213 (forward) and 214 (reverse) for controlling the directional control valve 212; a counterbalance valve 215; a variable displacement hydraulic motor 216; and a capacity control device 217 for controlling the capacity of the hydraulic motor 216. This arrangement controls return oil from the counterbalance valve 215 to effect speed control (runaway prevention) when descending a slope.

However, such a prior art encounters the following problems. That is, the use of the counterbalance valve in a traveling circuit reduces efficiency because the forward-reverse directional control valve and the counterbalance are controlled by restriction. Moreover, since heat is generated while traveling, a larger radiator and a larger output engine are required, so that the size and cost of the vehicle increases.

In addition, the use of the closed center valve, in the traveling circuit of a vehicle emphasizing operability, encounters a similar malfunction because the valve is controlled by restriction similar to the counterbalance valve. Particularly, in a high-speed, long-distance traveling vehicle, the resistance increases, reducing efficiency, and the heating value also increases, so that a large radiator is required.

Further, the use of the open circuit type in a speed changing device for hydraulic driving apparatuses, such as construction vehicles emphasizing traveling efficiency and controllability, encounter the following problem. When a forward-reverse speed change, such as from neutral to forward, from forward to reverse and from reverse to forward, is effected, a start or a speed change operation is performed regardless of the present vehicle speed. During operation, if the shift lever does not correspond to the actual traveling direction of the vehicle, braking action is effected until the motor rotation is reduced to zero. When control is exercised without recognizing the braking action, there occurs a malfunction such that cavitation occurs and excessive braking is applied. For example, the case of switching to the reverse direction while rotating in the forward direction at high speed is shown in FIGS. 15A to 15F.

FIG. 15A shows pilot pressure for operating a directional control valve in the forward direction by actuation of a forward side solenoid operated proportional valve, and FIG. 15B shows a pilot pressure for operating the directional control valve in the reverse direction by actuation of a reverse side solenoid operated proportional valve, respectively. FIG. 15C shows a pressure Pa for rotating the hydraulic motor in the forward direction, and FIG. 15D shows a pressure Pb for rotating the hydraulic motor in the reverse direction, respectively. In addition, FIG. 15E shows a pilot pressure of a solenoid operated proportional valve for actuating an inclined shaft which controls displacement of the hydraulic motor. Further, FIG. 15F shows the rotational speed of the hydraulic motor output shaft in which the forward rotation output shaft decelerates.

An operation due to the switching will be described. Up to point W in FIG. 15A, the pilot pressure is applied in the forward direction, and the pilot pressure is applied in the reverse direction after point W in FIG. 15B. This applies a brake on the hydraulic motor from point W to decelerate the output shaft, as shown in FIG. 15F. At this time, however, the supply pressure Pa of the hydraulic motor in FIG. 15C becomes zero because the directional control valve is closed. However, the pressure Pb in FIG. 15D causes cavitation at point V because the forward supply has already been cut off, even though the hydraulic motor is still rotating in the forward direction due to the inertia of the vehicle. Thus, when high-speed rotation in the forward direction is decelerated and switched to the reverse direction, a problem arises such that cavitation occurs, which shortens the life of the hydraulic equipment, and a braking action cannot be effected, resulting in loss of control.

In addition, when the output shaft of the hydraulic motor is provided with an auxiliary transmission which interrupts torque using clutches, there is a problem such that, when forward-reverse switching with the shift lever, the rotational speed or the direction of the hydraulic motor before the switching does not match the rotational speed or direction of the hydraulic motor due to drag associated with coasting of the vehicle, whereby the hydraulic motor is damaged.

SUMMARY OF THE INVENTION

The present invention has been made to solve the drawbacks of the prior art, and its object is to provide a speed changing device for a hydraulic driving apparatus for use in construction vehicles, agricultural machinery, automobiles, etc., and a control method thereof, which have excellent traveling efficiency, controllability, and reliability.

In a first aspect of a speed changing device for a hydraulic driving apparatus according to the present invention, there is provided a speed changing device for a hydraulic driving apparatus including a hydraulic pump, driven by a driving source; a variable displacement hydraulic motor, for receiving pressurized oil from the hydraulic pump to output a driving force; and a closed center directional control valve, provided between the hydraulic pump and the hydraulic motor for switching between forward and reverse, wherein the device comprises: a shifter selected position sensor, for detecting a change of a shift lever selection; a motor rotational speed sensor, for detecting the rotational speed of the hydraulic motor; and a control device; wherein the control device judges and controls either a powering control or a brake control of the vehicle based on detected change of the shift lever selection and on a comparison of the detected motor rotational speed with a memorized motor rotational speed.

In addition, the device can comprise a staged back pressure valve for controlling the return pressure of a return circuit, formed between said directional control valve and an oil tank, at any of at least two different pressures; and the control device can output signals to the directional control valve, the staged back pressure valve, and the hydraulic motor based on the change of the shift lever selection and on a comparison of the detected motor rotational speed with a memorized minimum desirable motor rotational speed and a maximum desirable motor rotational speed when the detected motor rotational speed lies between the minimum desirable motor rotational speed and the maximum desirable motor rotational speed.

In a second aspect of a speed changing device for a hydraulic driving apparatus according to the present invention, there is provided a speed changing device for a hydraulic driving apparatus including a hydraulic pump; a variable displacement hydraulic motor; and a closed center directional control valve, provided between the hydraulic pump and the hydraulic motor for switching between forward and reverse; wherein the device comprises: a mode detection sensor, for detecting a selected position of a traveling mode or an operation mode; a motor rotational speed sensor, for detecting rotational speed of the hydraulic motor; a two-stage back pressure valve for controlling the return pressure of a return circuit, formed between the directional control valve and an oil tank, at any of at least two different pressures; and a control device; wherein the control device outputs a signal for allowing the hydraulic motor to have a predetermined discharge capacity, a signal for reducing the opening degree of the directional control valve to zero, and a signal for allowing the two-stage back pressure valve to have a predetermined back pressure, respectively, based on the selected position of the mode, and on the comparison of the detected motor rotational speed with a memorized minimum desirable motor rotational speed and a maximum desirable motor rotational speed when the detected motor rotational speed lies between the minimum desirable motor rotational speed and the maximum desirable motor rotational speed; and wherein the control device further outputs a signal for providing a predetermined braking amount, fitted to the detected traveling mode or the operation mode, when the pressure applied on the hydraulic motor is larger than a threshold value of a braking pressure.

In a third aspect of a speed changing device for a hydraulic driving apparatus according to the present invention, there is provided a speed changing device for a hydraulic driving apparatus including a hydraulic pump; a variable displacement hydraulic motor; and a closed center directional control valve, provided between the hydraulic pump and the hydraulic motor for switching between forward and reverse; wherein the device comprises: an auxiliary transmission connected to an output shaft of the hydraulic motor for interrupting torque by clutches; a shifter selected position sensor, for detecting the change of a shift lever selection; a motor rotational speed sensor, for detecting rotational speed of the hydraulic motor; and a control device; wherein the control device outputs a signal for engaging the clutches in order to measure the inlet/outlet pressure of the hydraulic motor rotated by the coasting of the vehicle when the change of the shift lever selection is detected and the detected motor rotational speed lies between a memorized minimum desirable motor rotational speed and a memorized maximum desirable motor rotational speed.

Next, in a first aspect of a speed change control method of a hydraulic driving apparatus according to the present invention, there is provided a speed change control method for a hydraulic driving apparatus supplying pressurized oil from a hydraulic pump to a hydraulic motor through a directional control valve so as to switch between forward and reverse by the directional control valve and to control the speed by the hydraulic motor; wherein the method comprises: measuring inlet/outlet pressure of the hydraulic motor, rotated by the coasting of the vehicle when the rotational speed of the hydraulic motor, upon detection of the change of the shift lever selection, lies between a memorized minimum desirable motor rotational speed and a memorized maximum desirable motor rotational speed; and judging and controlling either a powering control or a brake control of the vehicle based on the changed position of the shift lever selection and the inlet/outlet pressure.

In addition, when measuring the inlet/outlet pressure of the hydraulic motor, clutches secured to an output shaft of the hydraulic motor for interrupting torque can be engaged to measure the inlet/outlet pressure.

In a second aspect of a speed change control method of a hydraulic driving apparatus according to the present invention, there is provided a speed change control method for a hydraulic driving apparatus supplying pressurized oil from a hydraulic pump to a variable displacement hydraulic pump through a closed center directional control valve so as to switch between forward and reverse by the directional control valve and to control speed by the hydraulic motor, wherein a discharge capacity of the hydraulic motor is reduced and the opening degree of the directional control valve is reduced, so as to generate a braking force of the hydraulic motor, and the return pressure to an oil tank is increased by actuating a two-stage back pressure valve, so as to increase the oil supply to the hydraulic motor and prevent an occurrence of cavitation, when performing a brake control in case the rotational speed of the hydraulic motor, upon detection of the change of the shift lever selection, lies between a memorized minimum motor rotational speed and a memorized maximum motor rotational speed.

According to such constructions of the speed changing device for a hydraulic driving apparatus and a speed change control method thereof, a different action and effect can be obtained as compared to a conventional prevention of occurrence of cavitation in which, for example, a counterbalance valve is used and braking action responsive to a supply rate from the hydraulic pump is employed. That is, according to the present invention, a closed center directional control valve (for example, a closed center load sensing valve) is controlled without using a counterbalance valve in an open circuit, and separately in braking and in powering. Further, the use of the two-stage back pressure valve enables smooth starting and speed changing without causing cavitation.

In addition, by using the open circuit type, improvement in operability, which is a merit of the closed center load sensing circuit, can be obtained in the operation mode. On the other hand, in the traveling mode, opening of the closed center directional control valve can lower the oil pressure resistance, whereby the heating value is reduced and the traveling efficiency can be improved. Since a braking force is changed corresponding to the selection of the operation mode or the traveling mode, operability can be improved.

Further, the auxiliary transmission, having an enlarged speed reduction ratio, can be provided so as to reduce the size of the hydraulic motor. When the transmission torque of the auxiliary transmission is interrupted by clutches, the clutches can be engaged to measure the inlet/outlet pressure of the hydraulic motor during coasting, so as to effect a brake control from the changed position of the shift lever and the inlet/outlet pressure. This matches the rotational speed and the direction of the hydraulic motor before engaging the clutches and upon the engagement of the clutches, so that a problem of damage to the hydraulic motor is eliminated, thereby improving reliability of hydraulic equipment.

BRIEF DESCRIPTION OF DRAWINGS

FIGS. 5A to 5G illustrate the change of various properties with time, in which

FIG. 5A is a diagram showing the pressure of a forward solenoid operated directional control valve;

FIG. 5B is a diagram showing the pressure of a reverse solenoid operated directional control valve;

FIG. 5C is a diagram showing the forward pressure of a hydraulic motor;

FIG. 5D is a diagram showing the reverse pressure of the hydraulic motor;

FIG. 5E is a diagram showing the pressure of a motor solenoid operated valve;

FIG. 5F is a diagram showing the rotational speed of a hydraulic motor output shaft; and FIG. 5G is a diagram showing an operation of a two-stage back pressure valve;

FIGS. 11A to 11H illustrate the changes of various properties with time when switched from coasting at neutral to reverse according to the second embodiment, in which FIG. 11A is a diagram showing the clutch oil pressure;

FIG. 11B is a diagram showing the pressure of a forward solenoid operated directional control valve;

FIG. 11C is a diagram showing the pressure of a reverse solenoid operated directional control valve;

FIG. 11D is a diagram showing the forward pressure of the hydraulic motor;

FIG. 11E is a diagram showing the reverse pressure of the hydraulic motor;

FIG. 11F is a diagram showing the pressure of a motor solenoid operated valve;

FIG. 11G is a diagram showing the rotational speed of the hydraulic motor output shaft; and FIG. 11H is a diagram showing an operation of a two-stage back pressure valve;

FIGS. 15A to 15F illustrate the changes of various properties with time of the speed changing device for a hydraulic driving apparatus according to the prior art, in which FIG. 15A is a diagram showing the forward pilot pressure;

FIG. 15B is a diagram showing the reverse pilot pressure;

FIG. 15C is a diagram showing the forward pressure of a hydraulic motor;

FIG. 15D is a diagram showing the reverse pressure of the hydraulic motor;

FIG. 15E is a diagram showing the pilot pressure of a solenoid operated proportional valve for an inclined shaft; and FIG. 15F is a diagram showing the rotational speed of the hydraulic motor output shaft.

BEST MODE FOR CARRYING OUT THE INVENTION

The preferred embodiments of a speed changing device for a hydraulic driving apparatus and a speed change control method thereof according to the present invention will be described in detail with reference to the attached drawings.

Figure 1:
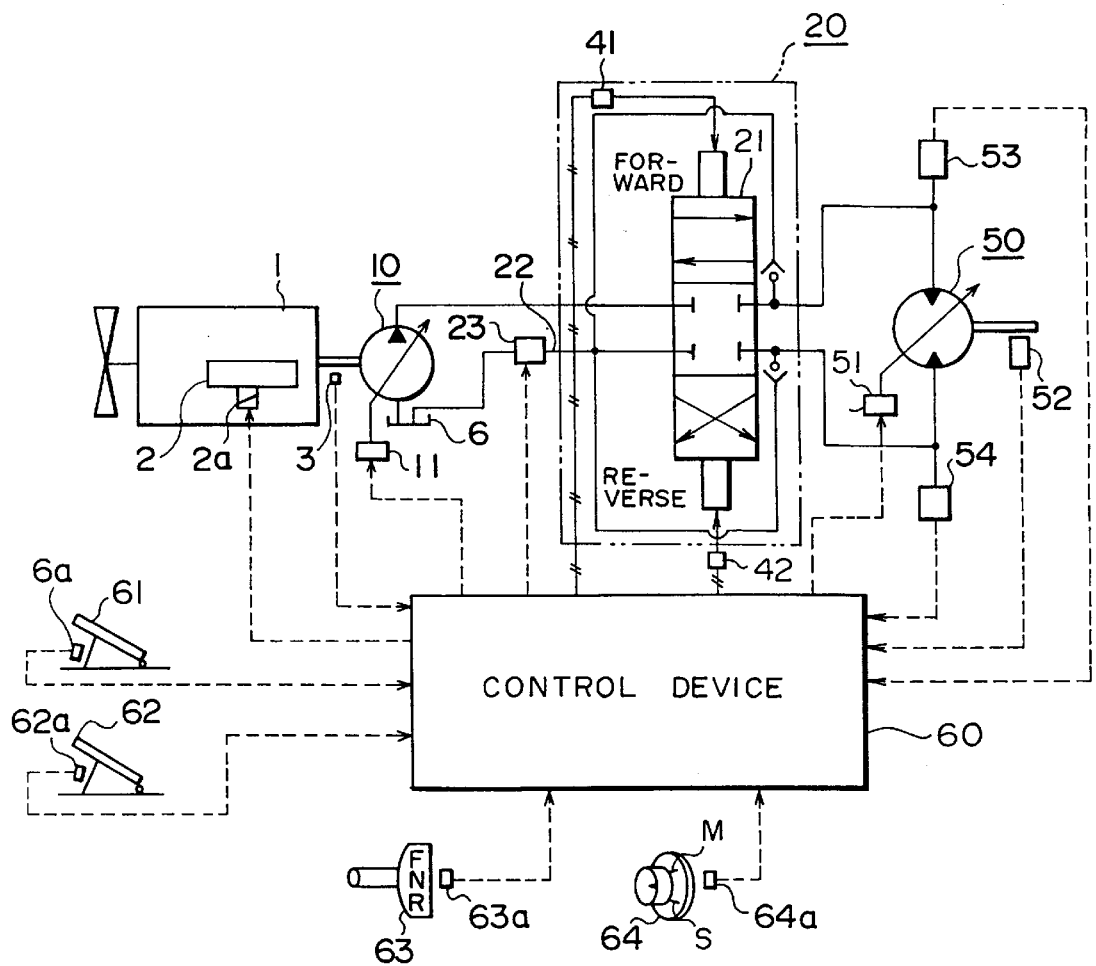
FIG. 1 illustrates a construction of a speed changing device for a hydraulic driving apparatus according to a first embodiment of the present invention.

FIG. 1 illustrates a speed changing device for a hydraulic driving apparatus according to a first embodiment. A variable displacement hydraulic pump 10 (hereinafter referred to as the hydraulic pump 10), driven by an engine 1, sucks oil from an oil tank 6 and converts the output of the engine 1 into pressurized oil. The pressurized oil is fed to a variable displacement hydraulic motor 50 (hereinafter referred to as the hydraulic motor 50) via a switching device 20, and converted into rotary torque by the hydraulic motor 50 to drive a construction vehicle, etc.

An actuator 2a is attached to a jet pump 2, which supplies fuel to the engine 1, and the actuator 2a receives a signal from a control device 60 to control the rotational speed and output of the engine 1. The hydraulic pump 10 and the hydraulic motor 50 are provided with servo devices 11, 51, respectively, for controlling a swash plate, etc., which allows the displacement to be variable. Pilot pressure passing through a solenoid operated directional control valve, which is switched upon receipt of a signal from the control device 60, acts on the servo devices 11, 51 to variably control the discharge capacities of the hydraulic pump 10 and the hydraulic motor 50.

A closed center load sensing valve (a closed center directional control valve) 21 (hereinafter, referred to as CLSS valve 21) of the switching device 20 has three positions. The pilot pressure from the solenoid operated directional control valves 41, 42, which are switched upon receipt of a signal from the control device 60, act on both ends of the CLSS valve 21, and the CLSS valve 21 is switched to a forward position ("forward" shown in the drawing) or a reverse position ("reverse" shown in the drawing). A return circuit 22, formed between the CLSS valve 21 and the oil tank 6, is provided with a variable pressure two-stage back pressure valve 23, which is switched in two stages by the signal from the control device 60 and controls the return pressure of the oil being returned to the tank 6.

Connected to the control device 60, are: an engine rotational speed sensor 3, for detecting rotational speed of the engine 1; a motor rotational speed sensor 52, for detecting a rotational speed of the hydraulic motor 50 to detect the vehicle speed; and motor pressure sensors 53 and 54, for detecting the inlet and outlet pressures in pipes 56 and 57 (see FIG. 2) connected to the hydraulic motor 50. Here, for reasons of convenience, the sensor 53, which is secured to the pipe 56 on which pressure acts in the direction of forward rotation of the hydraulic motor 50, is referred to as the forward pressure sensor 53; and the sensor 54, secured to the opposite side pipe 57, is referred to as the reverse pressure sensor 54. Incidentally, although the motor rotational speed sensor 52 detects the rotational speed and direction, two sensors can be provided to detect the rotational speed and the direction separately.

In addition, the control device 60 is provided with an accelerator pedal 61, for controlling the vehicle speed; a brake pedal 62, for controlling the vehicle braking; and a shifter 63, for selecting a vehicle travelling direction. Further, an accelerating amount detection sensor 61a, for detecting an accelerating amount, is attached to the accelerator pedal 61; a braking amount detection sensor 62a, for detecting a braking amount, is attached to the brake pedal 62; and a shifter selected position sensor 63a, for detecting a vehicle traveling direction, is attached to the shifter 63. A mode detection sensor 64a is attached to a mode selection switch 64, and the mode detection sensor 64a detects an operation mode S, which becomes a selected mode to actuate an operating machine (not shown) attached to the vehicle, and a traveling mode M, which becomes a vehicle traveling selected mode.

The signals are inputted to the control device 60 from each of the above-described sensors.

Figure 2:
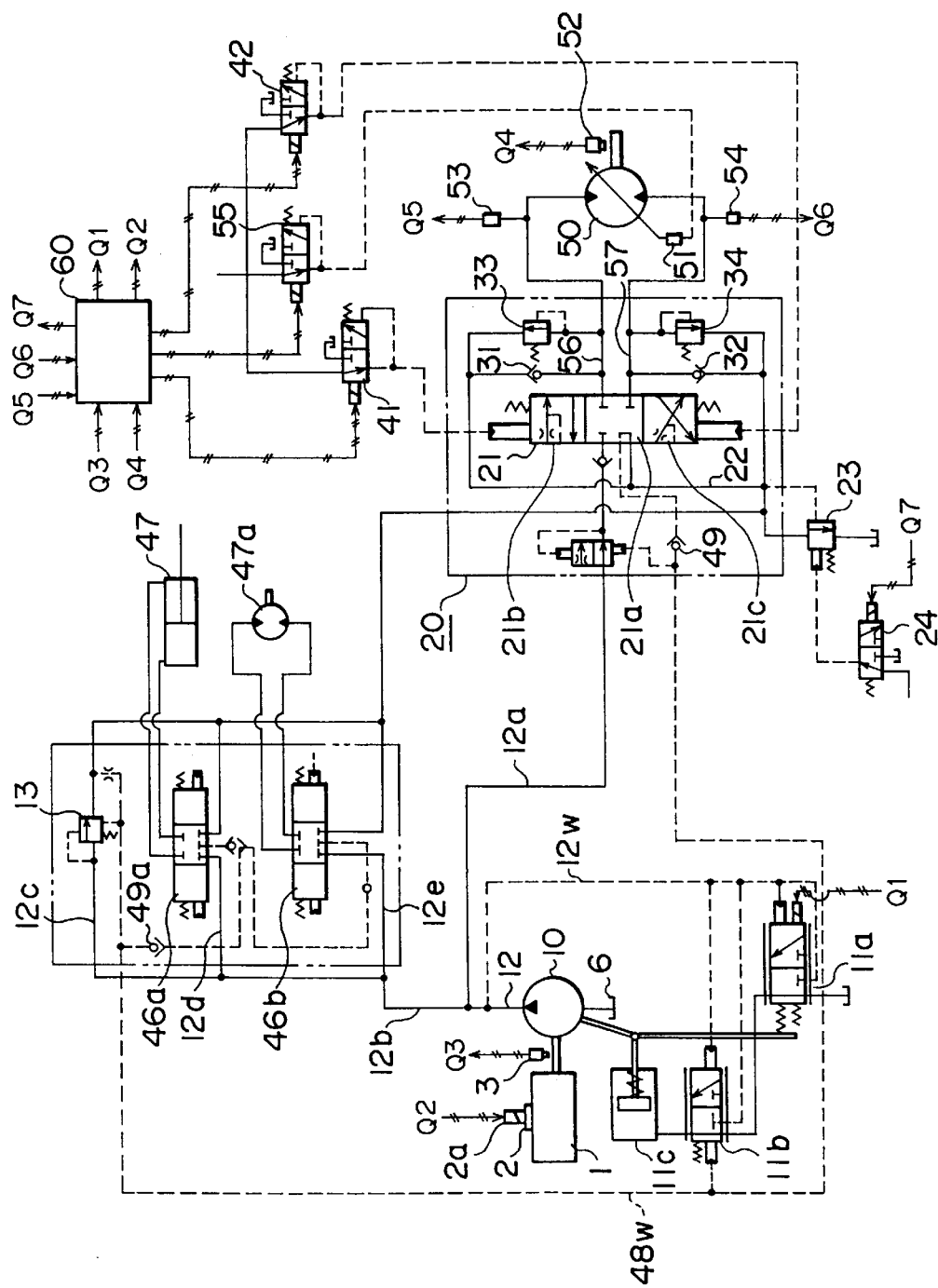
FIG. 2 is a detail view of FIG. 1.

Referring to FIG. 2, a pipe 12, which is secured to a hydraulic pump 10 is branched, and the switching device 20 is connected to one branched pipe 12a. The other branched pipe 12b is further branched into pipes 12c, 12d, 12e. An unload valve 13 is connected to the pipe 12c, and a plurality of operating machine CLSS valves 46a and 46b are connected to the pipes 12d and 12e. The operating machine CLSS valves 46a and 46b supply and discharge pressurized oil to and from operating machine actuators 47 and 47a. Incidentally, although the pipe 12b is further branched into a plurality of pipes, and connected to a further plurality of operating machine CLSS valves, they have been omitted as they are similar to those described above.

The servo device 11 of the hydraulic pump 10 is composed of a torque value control valve 11a (hereinafter, referred to as a TVC valve 11a), a load sensing valve 11b (hereinafter, referred to as an LS valve 11b), and a servo 11c. The TVC valve 11a is connected to a pilot tube 12w, which extends from the pipe 12, and a signal from the control device 60 is inputted to the TVC valve 11a. The TVC valve 11a receives a signal from the control device 60 to widely control the discharge pressure of the hydraulic pump 10 via the LS valve 11b. That is, the TVC valve 11a has a power mode function, the function for widely and freely controlling a discharge amount of the hydraulic pump 10. For example, when an ordered current value from the control device 60 is small, the pump discharge amount is maximum, and when the ordered current value is large, the reduction of the pump discharge amount enables a constant torque control, etc., in which [pump discharge capacity (cc/rev)× discharge pressure] is held constant.

A pilot tube 12w and a tube 48w, of an LS circuit, are connected to the LS valve 11b. The LS valve 11b receives the highest pressure PS among the pressures from the LS circuit of the CLSS valve 21 and the operating machine CLSS valves 46a and 46b through the check valves 49 and 49a, and the discharge pressure PP of the hydraulic pump 10. In addition, the LS valve 11b controls the pressure sent from the TVC valve 11a to the servo 11c, so that an LS differential pressure PLS (=PP−PS), which is the differential pressure between the discharge pressure PP and the pressure PS, is held constant, thereby controlling an angle of the swash plate (the discharge amount of the pump) of the hydraulic pump 10.

The switching device 20 comprises the CLSS valve 21, check valves 31 and 32, and safety valves 33 and 34. One side of each of the check valve 31 and 32 and the safety valve 33 and 34 is connected between the CLSS valve 21 and the hydraulic motor 50. Each other side thereof is connected between the CLSS valve 21 and the two-stage back pressure valve 23 by means of the return circuit 22 from the CLSS valve 21. Pilot pressure, for switching to forward or reverse, acts on both ends of the CLSS valve 21 so as to switch the CLSS valve 21 in accordance with the operation of the shifter 63 (see FIG. 1). The pilot pressure is generated when discharge pressure of a pilot pump (not shown) receives a signal from the control device 60, so that the forward solenoid operated directional control valve 41 or the reverse solenoid operated directional control valve 42 is switched.

A motor solenoid operated directional control valve 55 is switched upon receipt of a signal from the control device 60, and the pressure of the pilot pump acts on the servo device 51 of the hydraulic motor 50 so as to control the displacement of the hydraulic motor 50. The hydraulic motor 50 receives the discharge amount from the hydraulic pump 10 in accordance with an accelerating amount to output a predetermined rotational speed, i.e., a predetermined vehicle speed.

The solenoid operated directional control valve 24 is switched upon receipt of a signal from the control device 60, and the pressure of the pilot pump acts on the two-stage back pressure valve 23 so as to control the return pressure in the two stages of high pressure and low is pressure. In the high pressure stage, the discharge return oil from the hydraulic motor 50 is fed to the supply pipe 56 or 57 from the hydraulic pump 10 to the hydraulic motor 50 through the check valve 31 or 32. In the low pressure stage, the oil is returned to the oil tank 6 as it is.

An operation of the first embodiment constructed as described above will be described.

First, there is a power traveling which is a condition where the hydraulic motor 50 is actuated, and torque is transmitted to effect starting, acceleration, or constant speed traveling of the vehicle. In addition, there is a braking region for effecting a braking operation by the hydraulic motor 50 for driving down a slope, for deceleration, or for stopping the vehicle. The operation in such conditions will be described with reference to the flowcharts of FIGS. 3 and 4.

In step 301, when the shifter 63 is not changed from a forward position F without operation, not operated to effect forward or reverse from a vehicle stop condition, or not changed to the reverse position R from the forward position F or to the forward position from the reverse position R, and when the rotation of the hydraulic motor is low, i.e., in the case of NO in step 301, a procedure advances to a normal process of step 302 to perform the next power traveling.

Signals from each of the sensors are inputted to the control device 60. Among them, by the signals from the motor rotational speed sensor 52, the shifter selected position sensor 63a, and the accelerating amount detection sensor 61a, a hydraulic driving apparatus is operated as follows. For example, in the case of forward travel, the forward solenoid operated directional control valve 41 is switched by the signal of the shifter selected position sensor 63a and the signal of the accelerating amount detection sensor 61a, in accordance with the accelerating amount of the accelerator pedal 61 from the control device 60. By this switching, the pilot pressure to be sent to the CLSS valve 21 is controlled and signals are also sent to the servo device 51 of the hydraulic motor 50. This switches the motor solenoid operated directional control valve 55, and controls the swash plate, etc., so that the hydraulic motor 50 has a predetermined displacement.

At this time, the CLSS valve 21 takes a large opening degree amount with little resistance to the discharge amount from the hydraulic pump 10, and sends a discharge amount from the hydraulic pump 10 to the hydraulic motor 50 so as to provide a predetermined rotational speed, i.e., a predetermined vehicle speed. The return oil from the hydraulic motor 50 is returned to the oil tank 6 via the CLSS valve 21 and the low-pressure two-stage back pressure valve 23. At this time, a power traveling of a normal process less internal resistance of the CLSS valve 21 is performed.

In addition, in step 301, for example, when an operator operates the shifter 63 from the forward position F to the reverse position R, i.e., in the case of YES, the procedure advances to step 303. However, the hydraulic driving apparatus is operated as follows.

At the forward position F, the forward solenoid operated directional control valve 41 is switched by the signals of the shifter selected position sensor 63a and the accelerating amount detection sensor 61a in accordance with the accelerating amount of the accelerator pedal 61. By this switching, the pilot pressure is controlled and sent to the CLSS valve 21, and signals are also sent to the servo device 51 of the hydraulic motor 50. The motor solenoid operated directional control valve 55 is switched, and the swash plate, etc., are controlled so that the hydraulic motor 50 has a predetermined displacement. This allows the CLSS valve 21 to be switched from a neutral position 21a to the forward position 21b, and pressure is generated in a forward side pipe of the hydraulic motor 50 to rotate the hydraulic motor in a forward direction. At this time, the CLSS valve 21 is opened with a predetermined opening degree by which no resistance is generated, and the discharge amount from the hydraulic pump 10 is discharged in accordance with the accelerating amount and sent to the hydraulic motor 50 via the CLSS valve 21, so that the hydraulic motor 50 obtains a predetermined rotational speed $\omega$out. In step 303, the rotational speed $\omega$out is compared with the minimum rotational speed $\omega$low of the motor. When $\omega$out<$\omega$low, the procedure advances to the normal process of step 302 to effect the operation in the same manner as described above.

On the other hand, when $\omega$out$\geq$$\omega$low, the procedure advances to step 304 to compare the rotational speed $\omega$out with the maximum rotational speed $\omega$high of the motor. In the comparison, when $\omega$out>$\omega$high, the procedure returns to step 303 to prohibit speed changing until the rotational speed becomes not more than the maximum desirable value of the motor. Therefore, step 303 and step 304 are repeated to wait for the rotational speed $\omega$out to become smaller than the maximum rotational speed $\omega$high of the motor. When $\omega$out$\leq$$\omega$high in step 304, the procedure advances to step 305.

In step 305, the control device 60 outputs the following signals. That is, the control device 60 outputs: a switching signal to the solenoid operated directional control valve 24, so that the two-stage back pressure valve 23 has high pressure; a switching signal to the solenoid operated directional control valve 55 of the servo device 51 which controls the swash plate, etc., so that the hydraulic motor 50 has the minimum displacement (predetermined value); and a signal for switching the CLSS valve 21 from the forward position 21b to the neutral position 21a. In the above description, the hydraulic motor 50 is allowed to have the minimum displacement for the purpose of reducing the braking force to the minimum. When a larger braking force is required, a displacement larger than the minimum one can be taken.

In step 306, whether or not a fixed period of time has elapsed is judged in order to stabilize cavitation, which may occur in step 305. When a fixed period of time has not elapsed, the elapse of time is waited, and the procedure advances to step 307 after the fixed period of time has elapsed and the cavitation has become stabilized. Here, the value of the forward pressure sensor 53 is referred to as Pca, and the value of the reverse pressure sensor 54 is referred to as Pcb. When the CLSS valve 21 is at the neutral position 21a and the hydraulic motor is not rotated in the direction designated by the shifter 63, braking pressure of the hydraulic motor 50 is generated at the inward pressure sensor 53 or 54, so that the following judgment is made.

In step 307, it is judged whether or not one of the pressures Pca and Pcb acting on the hydraulic motor 50 is larger than the brake threshold value PC required for braking. When smaller, i.e., when Pca$\leq$PC and Pcb$\leq$PC, a normal process is effected as in the case of step 302.

On the other hand, when larger (Pca is>PC, or Pcb>PC), the procedure advances to step 308 to judge whether the shift lever is forward F or reverse R. If forward F, the procedure advances to step 309 to compare the pressures Pca and Pcb for judgment. When Pca is$\leq$Pcb (NO), this coincides with forward F, so that a normal process is effected as in the case of step 302. When Pca>Pcb (YES), this does not coincides with forward F (the shift lever is in reverse R), so that the procedure advances to step 310.

In addition, when the shift lever is in reverse R in step 308, the procedure advances to step 311 to compare the pressures Pca and Pcb for judgment. When Pca$\geq$Pcb (NO), this coincides with reverse R, so that a normal process is effected as in the case of step 302. When Pca<Pcb, this does not coincide with reverse R (in forward F), so that the procedure advances to step 310. In step 310, it is judged by the mode detection sensor 64a whether the mode selection switch 64 is set to the operation mode S or the traveling mode M. When the traveling mode M is set, the procedure advances to step 313 in which a brake map outputs an M mode braking amount. That is, the brake map outputs a signal of the M mode braking amount to the solenoid operated directional control valve 41 or 42 which controls the CLSS valve 21, and to the servo device 51 of the hydraulic motor 50 so as to change a motor inclined shaft angle in accordance with an M mode accelerator opening degree, and to change an opening amount of the CLSS valve 21.

When the S mode is set, the procedure advances to step 312 to perform the same control, as that of the M mode, to the S mode. For example, in the M mode, the motor inclined shaft angle is significantly changed in accordance with the accelerator opening degree so as to greatly change the effectiveness of the brake, and in the S mode, a large motor inclined shaft angle is generally taken in accordance with the accelerator opening degree to obtain a great braking force. Incidentally, the criteria for judging the above description are, regarding the minimum rotational speed ωlow, for example, whether a permissible rotational speed is taken at which the hydraulic motor causes no cavitation with a supply rate supplied through the check valve 31 or 32 when the two-stage back pressure valve 23 has low pressure, whether a permissible rotational speed is taken at which the hydraulic motor itself causes no cavitation, or whether the value by which the motor rotates at a speed near zero is taken. In addition, regarding the maximum rotational speed ωhigh, the permissible rotational speed of the hydraulic motor which causes no cavitation with a supply rate supplied through the check valve 31 or 32 when the two-stage back pressure valve 23 is set to a high pressure, or the permissible rotational speed of the motor itself is taken.

In the above-described operation, change which occur when the accelerator opening degree is large and a high speed forward F is switched to reverse R will be described with reference to FIGS. 5A to 5G.

Figure 5A:
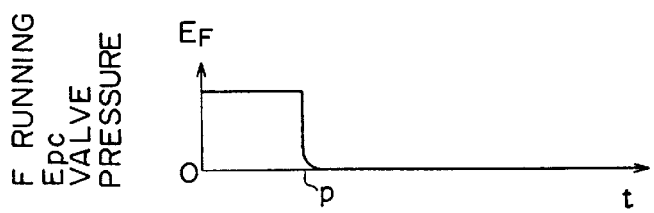

FIG. 5A shows the pressure of the forward solenoid operated directional control valve 41 for switching the CLSS valve 21 to the forward side, in which the operation stops at point p and the CLSS valve 21 has returned to the neutral position 21a (see FIG. 2).

Figure 5B:

FIG. 5B shows the pressure of the reverse solenoid operated directional valve 42 for switching the CLSS valve 21 to the reverse position 21c (see FIG. 2), in which the operation starts at point q and the CLSS valve 21 is switched to the reverse position 21c.

Figure 5C:
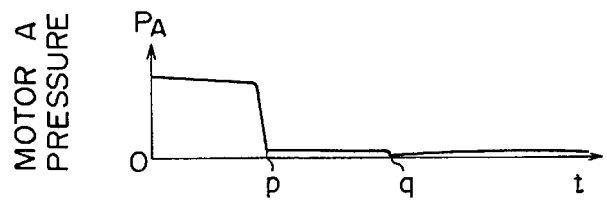

FIG. 5C shows the inlet side pressure for rotating the hydraulic motor 50 in the forward direction, in which the pressure, increased by the two-stage back pressure valve 23, supplies return oil to the hydraulic motor 50 through the check valve 31 or 32 from point p, so as to generate pressure at the inlet side. From point q, resistance of the return oil is applied to the normal tank 6 in which the two-stage back pressure valve 23 is not operated, so that the pressure is low.

Figure 5D:
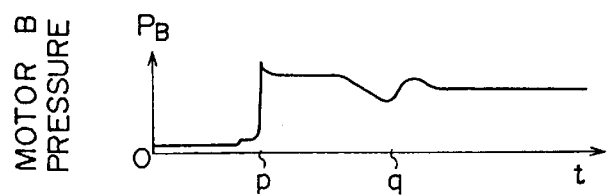

FIG. 5D shows an inlet side (the return oil side when forwarding) pressure for rotating the hydraulic motor 50 to the reverse direction, in which the CLSS valve 21 is closed at point p. For this reason, the pressure increases to apply a brake due to the hydraulic motor 50, and the hydraulic motor 50 starts deceleration, as shown in FIG. 5F. In addition, at point q in FIG. 5D, the reverse side 21c of the CLSS valve 21 is opened to start a control of supply pressurized oil for starting rotation of the hydraulic motor 50 in the reverse direction.

Figure 5E:
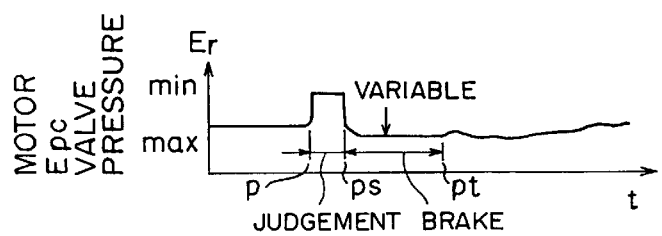
Figure 5F:
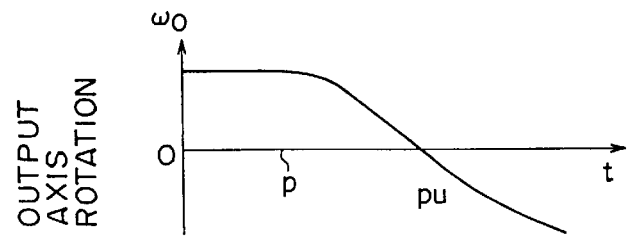

FIG. 5E shows the pressure of the solenoid operated directional control valve 55 for controlling the swash plate, etc., so that the hydraulic motor 50 has a predetermined displacement, in which the area between points p and ps is a time for judging the necessity of the brake by reducing the size of the swash plate, and in the area between the points ps and pt a predetermined (due to the brake map) braking force is applied.

FIG. 5F shows rotational speed of an output shaft of the hydraulic motor 50, in which the brake is applied from point p, and switched to the reverse solenoid operated directional control valve 42 at the position pu (point q in FIG. 5B) where the rotational speed is reduced to almost zero.

Figure 5G:
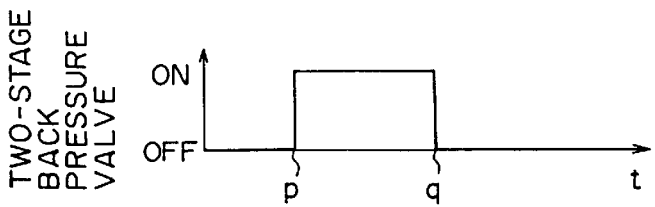

FIG. 5G shows an operation of the two-stage back pressure valve 23, in which the solenoid operated directional control valve 24 is switched upon receipt of a signal from the control device 60 at point p so as to control the return pressure to the oil tank 6 to high pressure, and to supply the return oil to the hydraulic motor 50 through the check valve 31 or 32.

Figure 3:
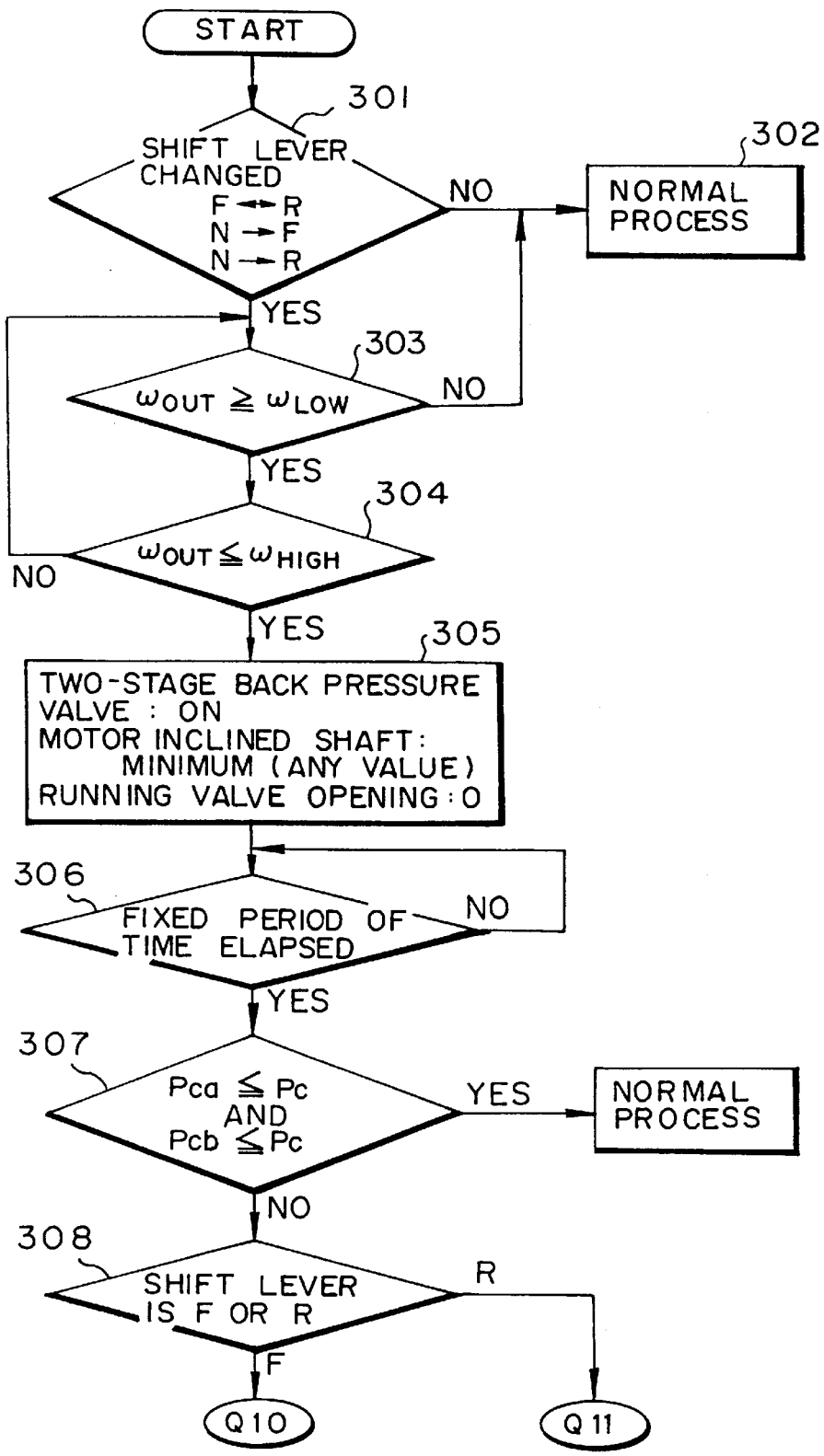
FIG. 3 is the first half of a flowchart of an operation of the speed changing device according to the first embodiment.
Figure 4:
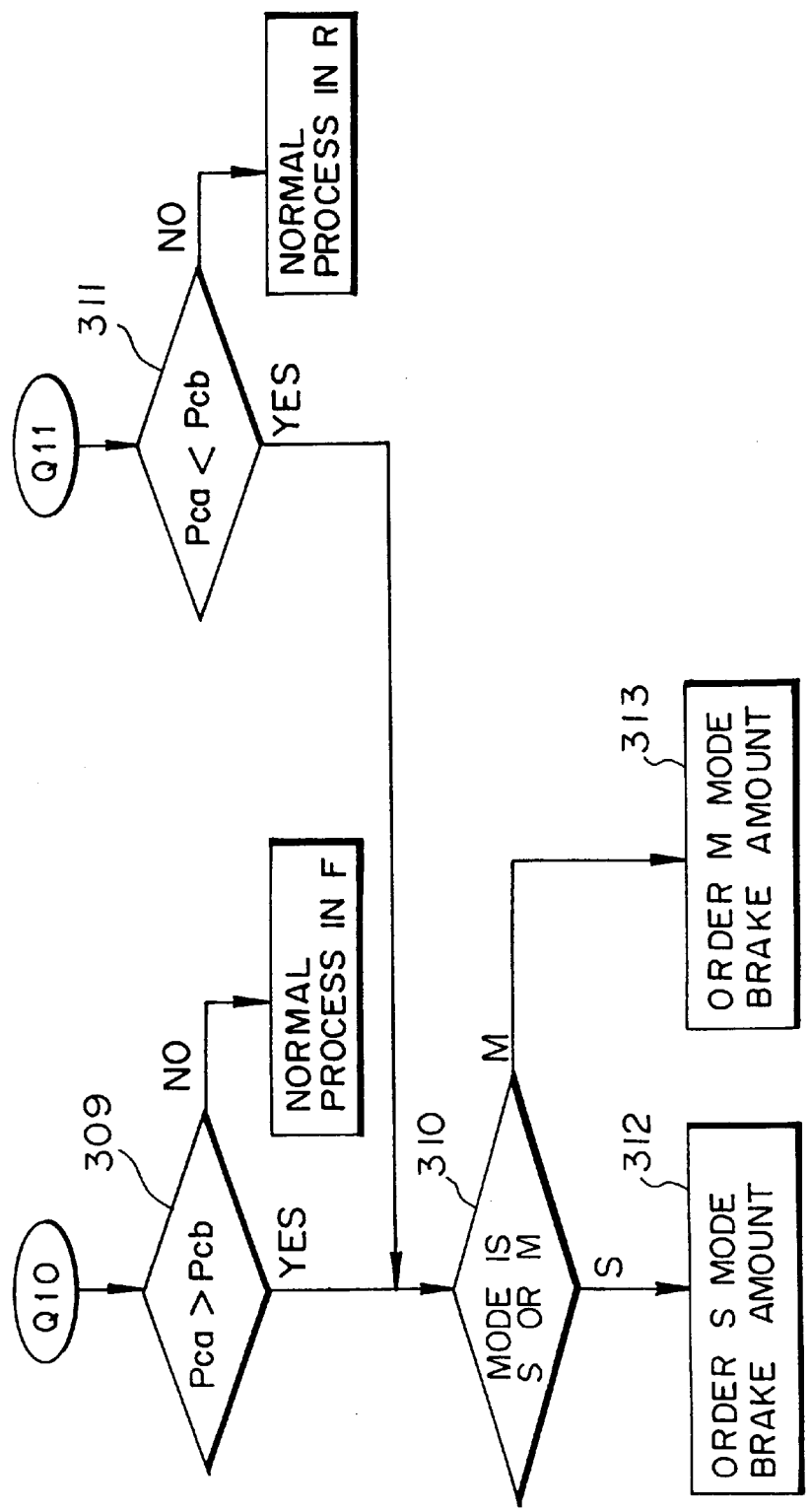
FIG. 4 is the latter half of the flowchart following FIG. 3.

As described above, it is shown that by controlling as in the flowcharts of FIGS. 3 and 4, the pressure of the inlet side where the hydraulic motor 50 rotates in the reverse direction shown in FIG. 5D has no disturbance in waveform and causes no cavitation. And, when traveling opposite to the direction designated by the shifter 63, the brake can be applied.

According to the above-described embodiment, inputting is effected immediately after connecting to the output shaft from the hydraulic motor 50. However, when there is no suitable large hydraulic motor in spite of a large vehicle, or when a large tractive power is required, the provision of an auxiliary transmission to the output shaft from the hydraulic motor can cope with such situations. In this case, the hydraulic motor is often used at high speed rotation, so that cavitation increasingly tends to occur. The effect of the present invention increases due to the prevention of such occurrence. The embodiment will now be described.

Figure 6:
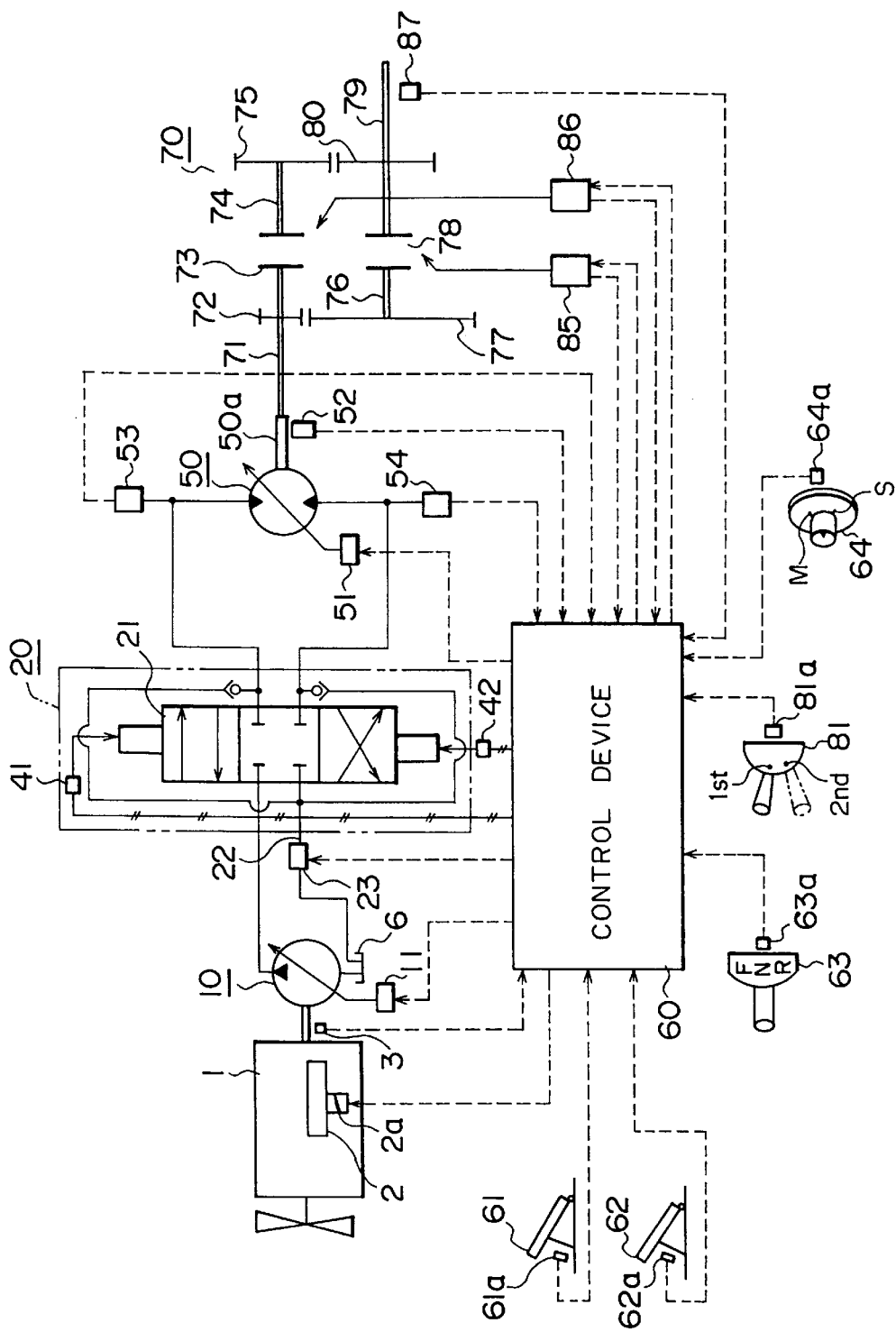
FIG. 6 illustrates a construction of a speed changing device for a hydraulic driving apparatus according to a second embodiment of the present invention.

FIG. 6 illustrates a speed changing device for a hydraulic driving apparatus according to a second embodiment. The output shaft 50a of the hydraulic motor 50 in the first embodiment is provided with an auxiliary transmission 70 of a clutch type. The auxiliary transmission 70 comprises, for example, a first speed and a second speed. To a shaft 71, coaxially coupled to the output shaft 50a, a gear 72 is fixed and a clutch 73 is disposed. To a shaft 74, coupled through the clutch 73, a gear 75 is fixed. In addition, to a countershaft 76, disposed parallel to the output shaft 50a, a gear 77 is fixed and a clutch 78 is disposed. To a countershaft 79 coupled through the clutch 78, a gear 80 is fixed.

The first speed clutch 73 is provided with a first speed electronic clutch oil pressure control valve 85, and the second speed clutch 78 is provided with a second speed electronic clutch oil pressure control valve 86. The countershaft 79 is connected to non-illustrated tires, and is provided with an output rotational speed sensor 87 for detecting the rotational speed of the tires so as to detect the vehicle speed. The control device 60 is provided with a speed stage lever 81, and a speed stage selected position sensor 81a is attached to the speed stage lever 81.

In the above description, the first speed of the auxiliary transmission 70 is outputted from the output shaft 50a via the shaft 71, the gear 72, a gear 77 meshed with the gear 72, the shaft 76, the clutch 78, and the countershaft 79. The second speed is outputted from the output shaft 50a via the shaft 71, the clutch 73, the shaft 74, the gear 75, a gear 80 meshed with the gear 75, and the countershaft 79. Switching between the first speed and the second speed of the auxiliary transmission 70 is performed in such a manner that the control device 60 outputs a signal to the first speed electronic clutch oil pressure control valve 85 or to the second speed electronic clutch oil pressure control valve 86, due to a signal from the speed stage selected position sensor 81a so as to engage a clutch corresponding to the signals.

Figure 7:
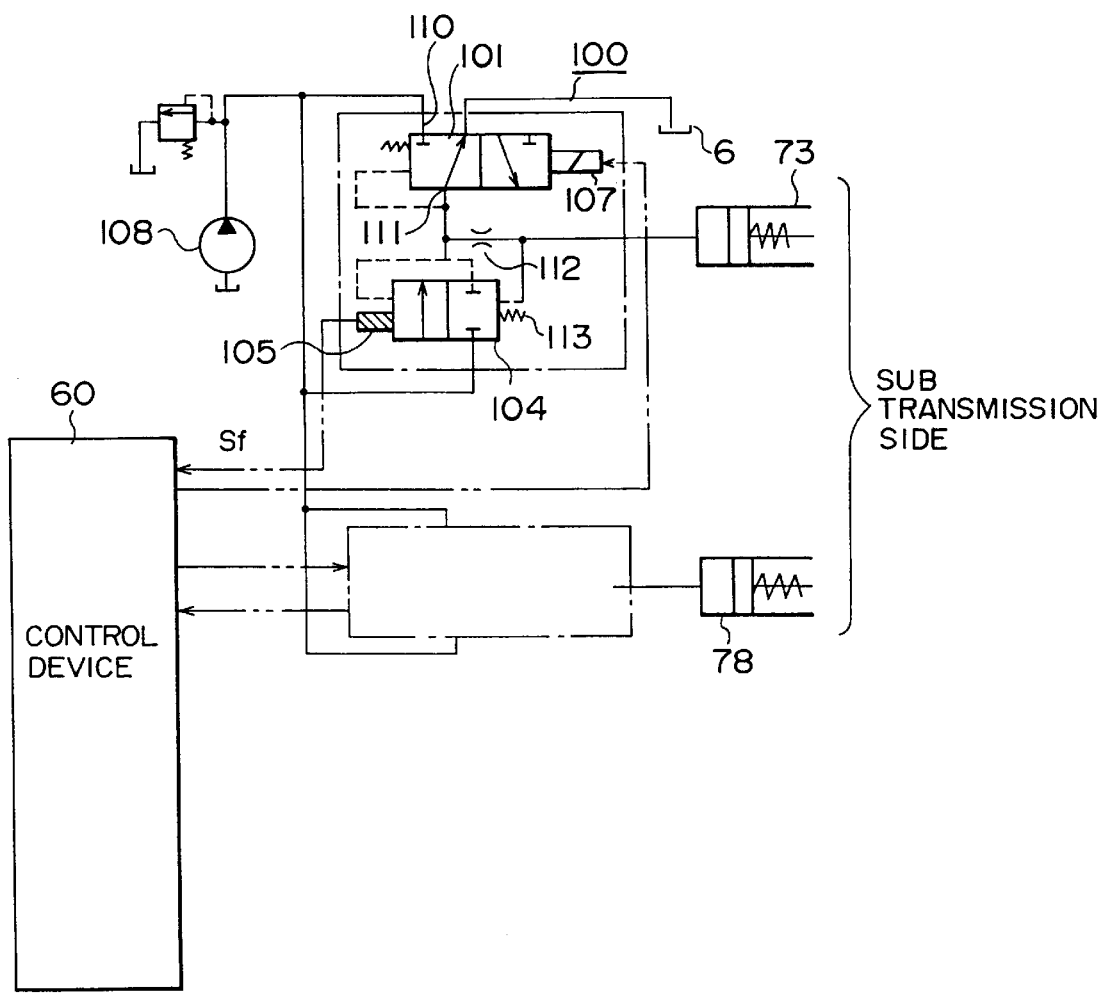
FIG. 7 is a hydraulic circuit diagram of a clutch oil pressure control valve according to the second embodiment.

The clutches 73 and 78 are composed of a hydraulic clutch circuit of an electronic clutch oil pressure control valve 100 including a control device shown in FIG. 7. The construction is similar to that disclosed in Japanese Unexamined Patent Publication No. 63-235730, which has already been filed by the applicant.

Referring to FIG. 7, the clutch oil pressure control valve 100 comprises a pressure control valve 101 for controlling clutch oil pressure, a flow rate detection valve 104, and a filling and clutch pressure detection sensor section 105. The pressure control valve 101 is controlled by the control device 60, and a detection signal Sf of the sensor section 105 is inputted to the control device 60.

A signal is outputted from the control device 60 to a proportional solenoid 107, the pressure control valve 101 is switched by thrust of the proportional solenoid 107 so as to allow oil from a pump 108 to enter through an inlet port 110, and to supply the oil to the clutches 73 and 78 through an outlet port 111. The flow rate detection valve 104 is opened until clutch packs of the clutches 73 and 78 are filled with oil through the outlet port 111. However, when the clutch packs are filled with the oil, the filling is completed and the flowing of the oil is stopped, so that the differential pressure between the front and the back of the orifice 112 is eliminated. For this reason, a spool (not shown) is switched by a spring 113, so that the sensor section 105 detects the completion of filling, and outputs the detection signal Sf to the control device 60.

Figure 8:
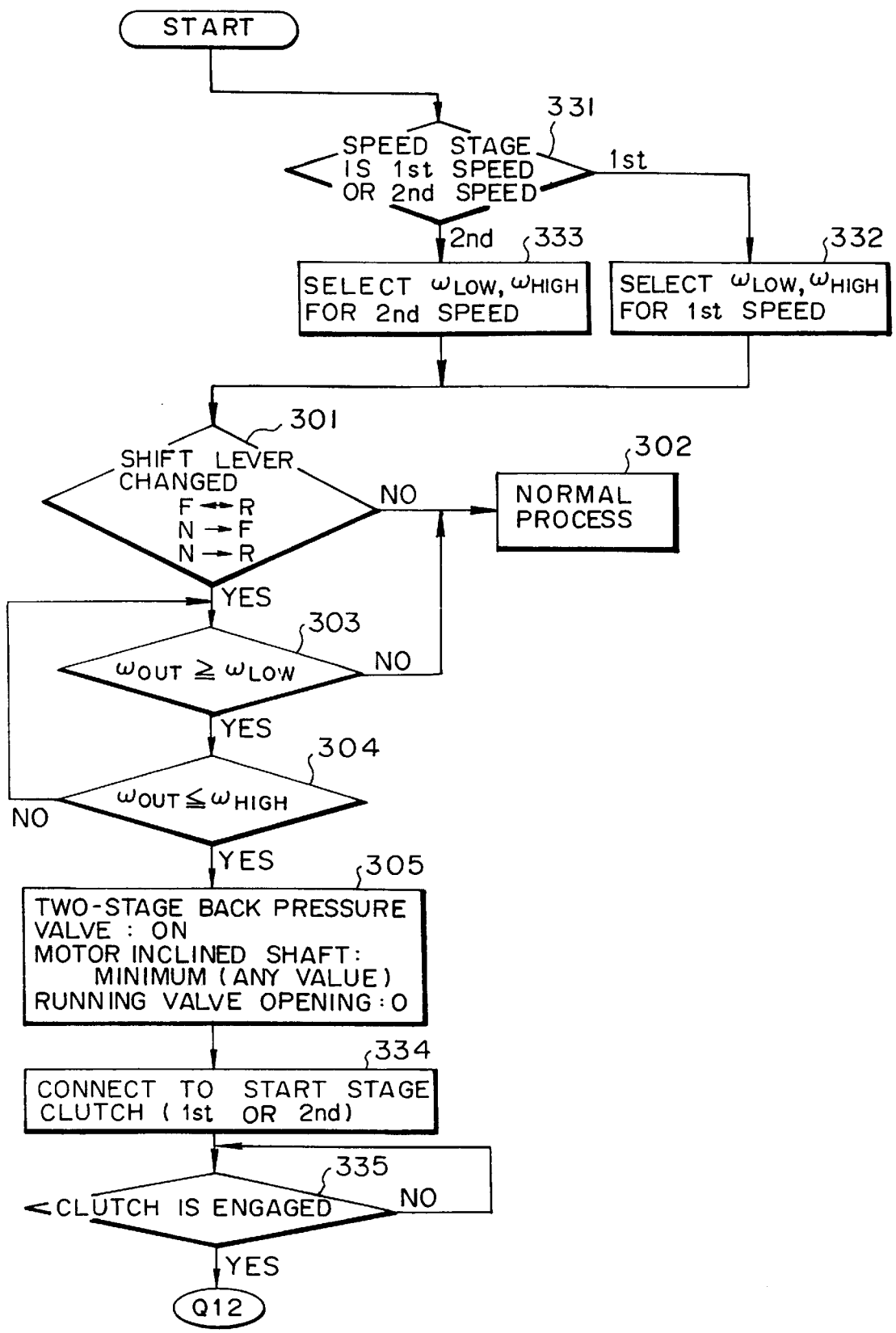
FIG. 8 is the first half of a flowchart of an operation of the speed changing device according to the second embodiment.

An operation of the foregoing second embodiment will be described with reference to the flowcharts of FIGS. 8 and 9. In step 331, it is judged whether the speed stage lever 81 is at the first speed stage or at the second speed stage. If the first speed stage, the procedure advances to step 332 to select the maximum rotational speed ωhigh and the minimum rotational speed ωlow of the first hydraulic motor 50 from a storage section of the control device 60. If the second speed stage, a procedure advances to step 333 to select the second speed ωhigh and ωlow from the storage section of the control device 60.

After selecting the rotational speed in accordance with the respective speed stages in steps 332 and 333, the procedure advances to step 301. In steps 301, 302, 303, 304, and 305, a process of each step is performed in accordance with the speed stage, as in the case of the first embodiment. After the control device 60 has outputted an ON order to the two-stage back pressure valve 23, a signal for reducing the size of the swash plate of the hydraulic motor 50, and a signal for reducing the opening degree of the CLSS valve 21 to zero in step 305, the procedure advances to step 334.

In step 334, a signal is outputted from the control device 60 to the clutch oil pressure control valve 100 to engage the clutch 73 or 78 in accordance with the first speed stage or the second speed stage of the speed stage lever 81 selected in step 331.

In step 335, the engagement of the clutch 73 or 78 is judged, by the detection signal Sf outputted from the sensor section 105 regarding the completion of filling and the clutch pressure, and the procedure advances to step 306 when the relative rotation number of the clutch 73 or 78 becomes smaller than a predetermined value.

In step 306, either the clutch 73 or 78 is engaged again, and the hydraulic motor 50 is connected to the tires so as to produce outlet/inlet pressure in the pipe 56 or 57 which flows out from and flows in to the hydraulic motor 50, rotated upon receipt of a driving force from the tires. Although the outlet/inlet pressure is detected by the motor pressure sensors 53 and 54, the outlet/inlet pressure is stabilized by waiting until the elapse of the fixed period of time and then, the procedure advances to step 307.

In steps 307, 308, 309, and 311, a process of each step is performed in accordance with the speed stage, as in the case of the first embodiment.

In step 310, whether the operation mode is the operation mode S or the traveling mode M is judged by the mode detection sensor 64a as in the case of the first embodiment. If the S mode, the procedure advances to step 336 to judge whether the speed stage lever 81 is in the first speed stage or in the second speed stage. The procedure advances to step 337 when it is in the first speed stage, and the procedure advances to step 338 when it is in the second speed stage, so as to change the motor inclined angle and the opening amount of the CLSS valve 21 in the first speed S1 mode and in the second speed S2 mode, respectively, in accordance with each accelerator opening degree.

In addition, if the M mode in step 310, the procedure advances to step 339 to judge whether the speed stage lever 81 is at the first speed stage or at the second speed stage. The procedure advances to step 340 when it is at the first speed stage, and the procedure advances to step 341 when it is at the second speed stage, so as to change the motor inclined angle and the opening amount of the CLSS valve 21 in the first speed M1 mode and in the second speed M2 mode, respectively, in accordance with each accelerator opening degree. In the above description, if the operation mode S, for example, the motor inclined shaft angle is enlarged (inclination-rotation angle) to increase the effectiveness of the brake to a load mounted on the operating machine, and the opening amount of the CLSS valve 21 is changed so as to be reduced.

Although a case is described where either the clutch 73 or 78 is engaged again in step 336, the clutch 73 or 78 may be kept engaged when the control device 60 judges a conversion between forward F and reverse R, i.e., non-stop in neutral.

Figure 10:
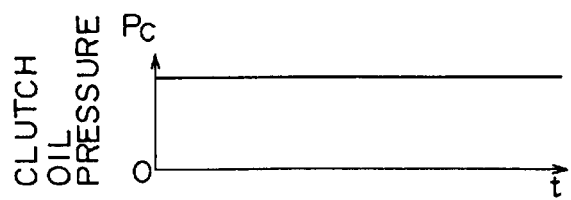
FIG. 10 is a diagram showing a change of clutch oil pressure with time when switched from forward to reverse according to the second embodiment.

In the above-described operation, the change in the clutch oil pressure, when the accelerator opening degree is large and a high speed forward F is switched to reverse R is shown in FIG. 10. Either the clutch 73 or 78 is kept engaged and the clutch oil pressure Pc is constant. Incidentally, the change in the pressure of the forward solenoid operated directional control valve 41 and the reverse solenoid operated directional control valve 42, the change in the inlet side pressure of the hydraulic motor 50, the change in the rotational speed of the output shaft of the hydraulic motor, etc., are the same as those of shown in FIGS. 5A to 5G, and explanation thereof has been omitted.

Next, in the above-described operation, a change, which occurs when the accelerator opening degree is large, the shifter 63 is stopped at neutral N from a high speed forward F for coasting and then switched to reverse R, will be described with reference to FIGS. 11A to 11H.

Figure 11A:
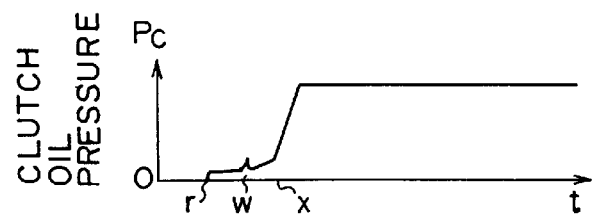

FIG. 11A shows clutch oil pressure Pc, generated in the clutch 73 by the signal from the control device 60 to the clutch oil pressure control valve 100. That is, when the vehicle coasts and the rotational speed ωout of the hydraulic motor 50 becomes not more than the maximum rotational speed ωhigh, this is the case where each signal of the above-described step 305 is outputted. At point r, the signal in step 334, i.e., the signal for engaging the clutch 73 or 78 is outputted to the clutch oil pressure control valve 100, so that the oil pressure Pc acts on the clutch 73 or 78. Further, the oil pressure Pc increases, and overshoot pressure is detected at point w. By this detection, the end of filling is detected to start engagement of the clutch. At point x, the clutch 73 or 78 has already finished complete engagement to provide a predetermined speed.

Figure 11B:
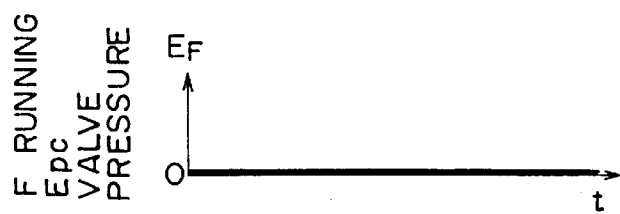

FIG. 11B shows the pressure EF of the forward solenoid operated directional control valve 41 for switching the CLSS valve 21 to the forward side, and shows that the pressure EF does not act on the forward side.

Figure 11C:
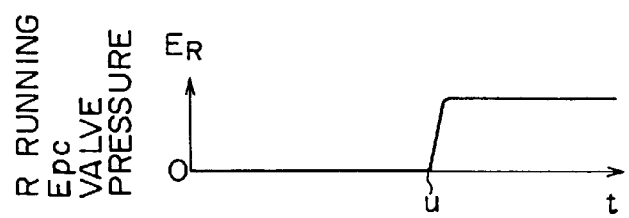

FIG. 11C shows the pressure EF of the reverse solenoid operated directional control valve 42 for switching the CLSS valve 21 to the reverse side, and operation starts at point u to switch the CLSS valve 21 to the reverse side. The point u is the point where the control device 60 outputs a signal to the reverse solenoid operated directional control valve 42, and the solenoid operated directional control valve 42 generates switching pressure when the rotational speed of the hydraulic motor 50 becomes not more than the predetermined value after the shifter 63 has been switched to reverse R.

Figure 11D:
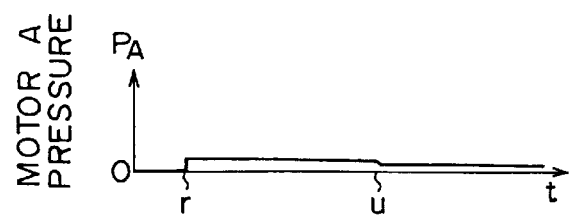

FIG. 11D shows an inlet side pressure PA for rotating the hydraulic motor 50 in the forward direction. By engagement of the clutch 73 or 78, the hydraulic motor 50 starts to rotate from point r with coasting, the pressure increased by the two-stage back pressure valve 23 supplies return oil to the hydraulic motor 50 through the check valve 31, so that the pressure PA is generated at the inlet side. From point u, the two-stage back pressure valve 23 is not operated and normal resistance of the return oil is applied to the tank 6, so that the pressure PA is low.

Figure 11E:
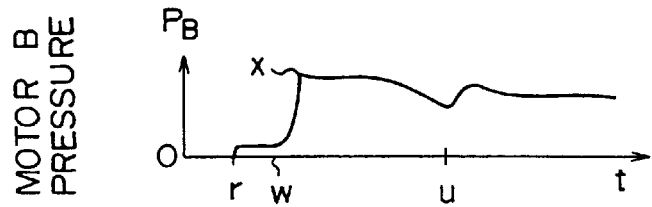

FIG. 11E shows an inlet side pressure PB for rotating the hydraulic motor 50 in the reverse direction. Like FIG. 11D, the hydraulic motor 50 starts to rotate from point r with drag due to coasting, and the pressure PB is generated. The pressure PB starts to increase due to the completion of filling at point w, and a braking action is suddenly generated by the hydraulic motor 50. At point u, the rotational speed of the hydraulic motor 50 is reduced, so that the pressure PB decreases. The pressure from the reverse solenoid operated directional control valve 42 acts on the CLSS valve 21 to switch to the reverse side when the rotational speed drops to about zero, so that the pressure PB becomes the predetermined pressure.

Figure 11F:
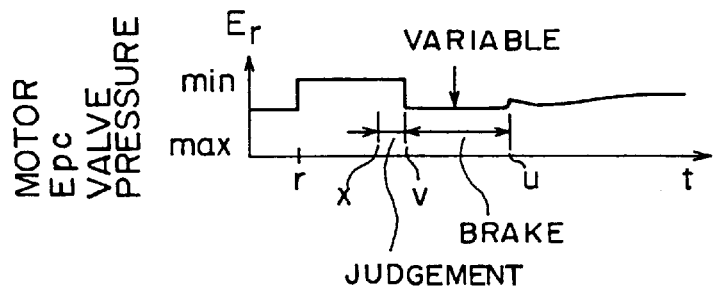

FIG. 11F shows a pressure Er of the motor solenoid operated directional control valve 55 for controlling the swash plate, etc., so that the hydraulic motor 50 has a predetermined displacement. By the signal in step 305 for reducing the size of the swash plate of the hydraulic motor 50, the solenoid operated directional control valve 55 is switched at point r to allow the hydraulic motor 50 to have a predetermined minimum displacement. When the fixed period of time has elapsed after the clutch engagement at point x, the inlet/outlet pressures PA and PB of the hydraulic motor 50 are measured for judgment. After the judgment, the inclination-rotation angle of the swash plate of the hydraulic motor 50 is enlarged from point v to apply a predetermined braking force. From point u, the solenoid operated directional control valve 42 is switched to supply pressurized oil from the hydraulic pump 10 to the hydraulic 50, and to generate driving torque for driving the vehicle in the reverse direction.

Figure 11G:
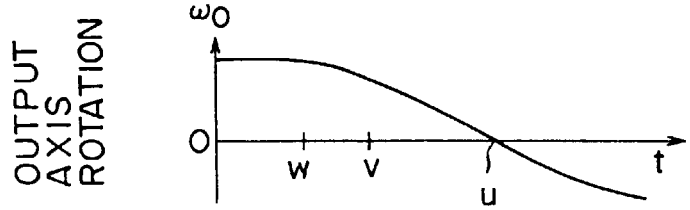

FIG. 11G shows rotational speed ω0 of the output shaft of the hydraulic motor 5. The brake is applied from point v, and the reverse solenoid operated directional control valve 42 is switched at point u where the rotational speed is reduced to about zero.

Figure 11H:
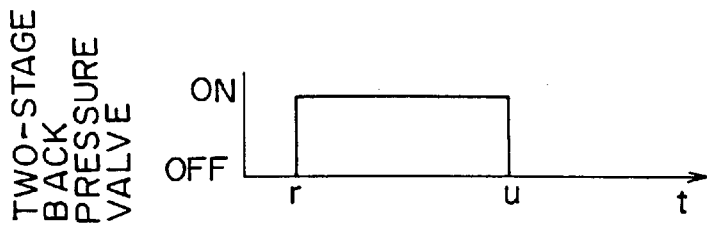

FIG. 11H shows an operation of the two-stage back pressure valve 23. The solenoid operated directional control valve 24 is switched at point r upon receipt of a signal from the control device 60, so as to control the return pressure to the oil tank 6 to be a high pressure. The operation of the two-stage back pressure valve 23 is removed at point u, so that the return pressure is low.

As described above, by controlling as in the flowcharts of this embodiment, there is no disturbance in the inlet pressure PB for rotating the hydraulic motor 50 in the reverse direction, as shown in FIG. 11E. That is, it is shown that no cavitation occurs.

Figure 12:
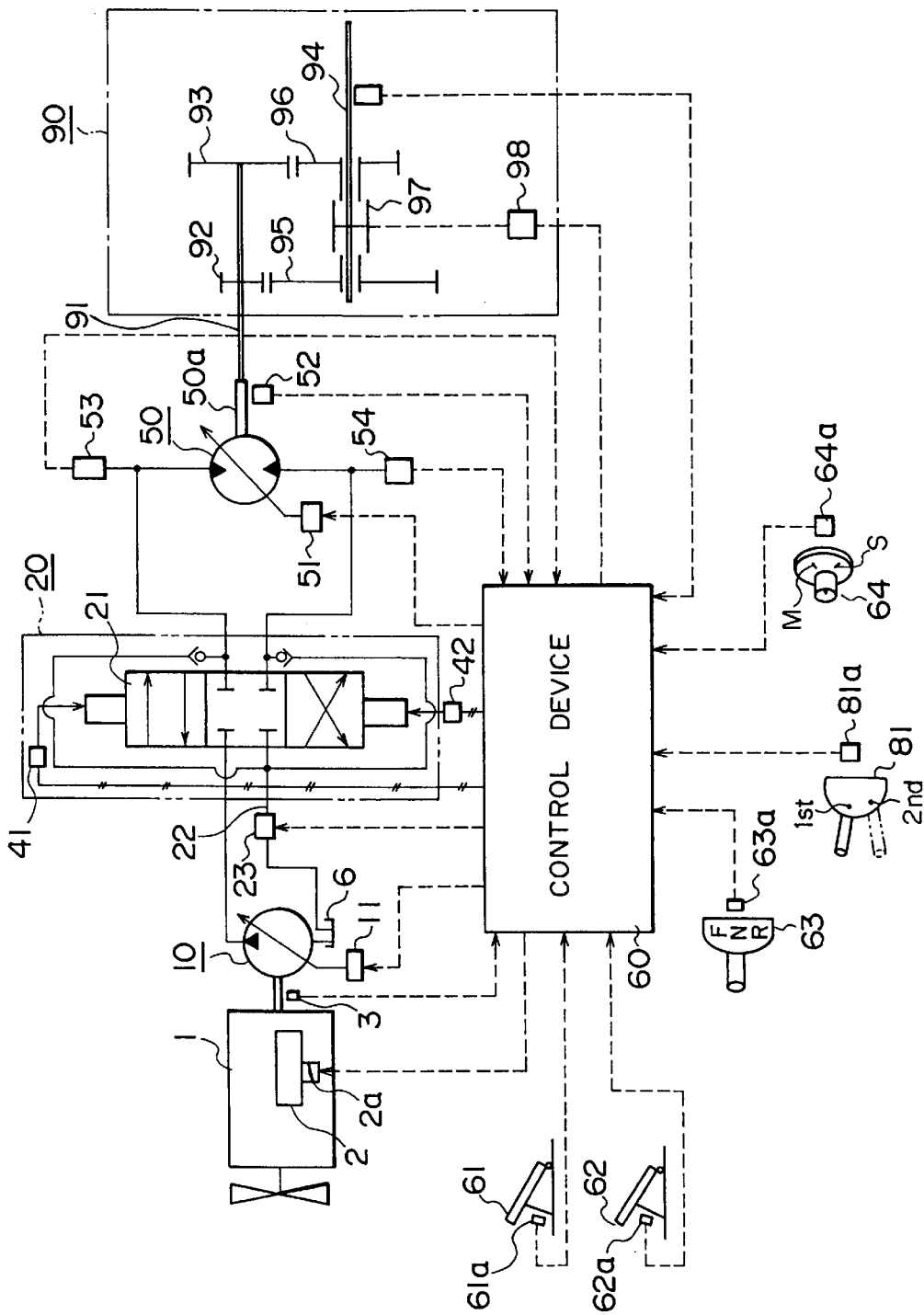
FIG. 12 illustrates a construction of a speed changing device for a hydraulic driving apparatus according to a third embodiment of the present invention.

FIG. 12 illustrates a speed changing device for a hydraulic driving apparatus according to a third embodiment. The output shaft 50a of the hydraulic motor 50 is provided with the auxiliary transmission 70 of the clutch type in the second embodiment, while in this third embodiment, it is provided with the auxiliary transmission 90 of a mechanical type.

The auxiliary transmission 90 comprises, for example, a first speed stage and a second speed stage, and a first speed stage gear 92 and a second speed stage gear 93 are fixed to a shaft 91, which is coaxially coupled to the output shaft 50a. A first speed stage gear 95 and a second speed stage gear 96 are rotatably provided on an output shaft 94, disposed parallel to the output shaft 50a. A synchromesh 97 is disposed between the gear 95 and the gear 96. The synchromesh 97 is always meshed with the first speed stage gear 95 or the second speed stage gear 96. The control device 60 outputs a signal to an electromagnetic servo 98 in accordance with a selection of the speed stage lever 81 to move a non-illustrated selector, thereby engaging the synchromesh 97 in response to the signal.

Therefore, the first speed of the auxiliary transmission 90 is outputted from the output shaft 50a via the shaft 91, the gear 92, the gear 95, the synchromesh 97, and the output shaft 94. The second speed is outputted from the output shaft 50a via the shaft 91, the gear 93, the gear 96 the synchromesh 97, and the output shaft 94. Switching of the auxiliary transmission 90 to the first speed stage or to the second speed stage is performed by a signal from the speed stage lever 81a attached to the control device 60.

Figure 9:
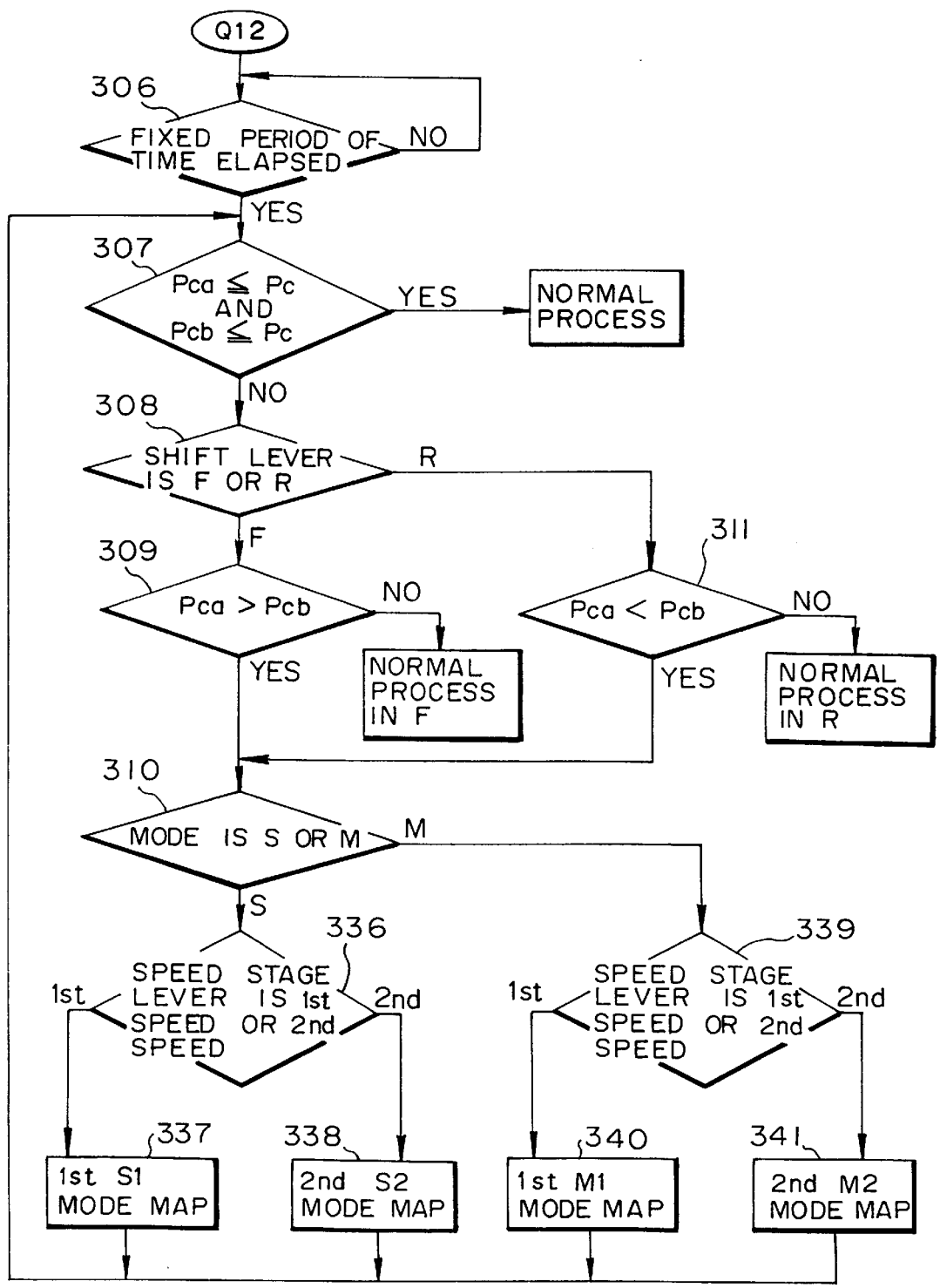
FIG. 9 is the latter half of the flowchart following FIGS. 8 and 13.
Figure 13:
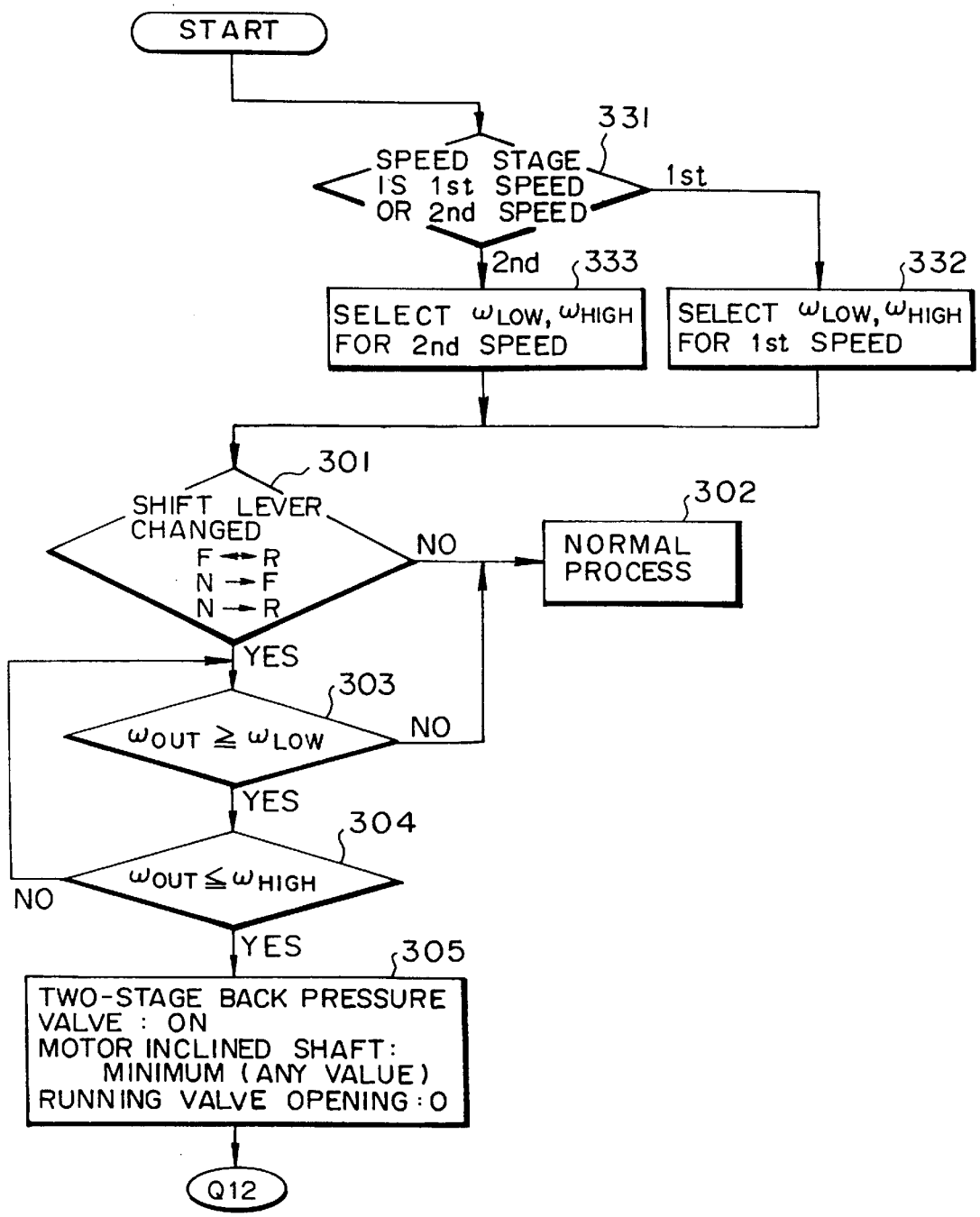
FIG. 13 is the first half of a flowchart of an operation of a speed changing device according to the third embodiment.
Figure 14:
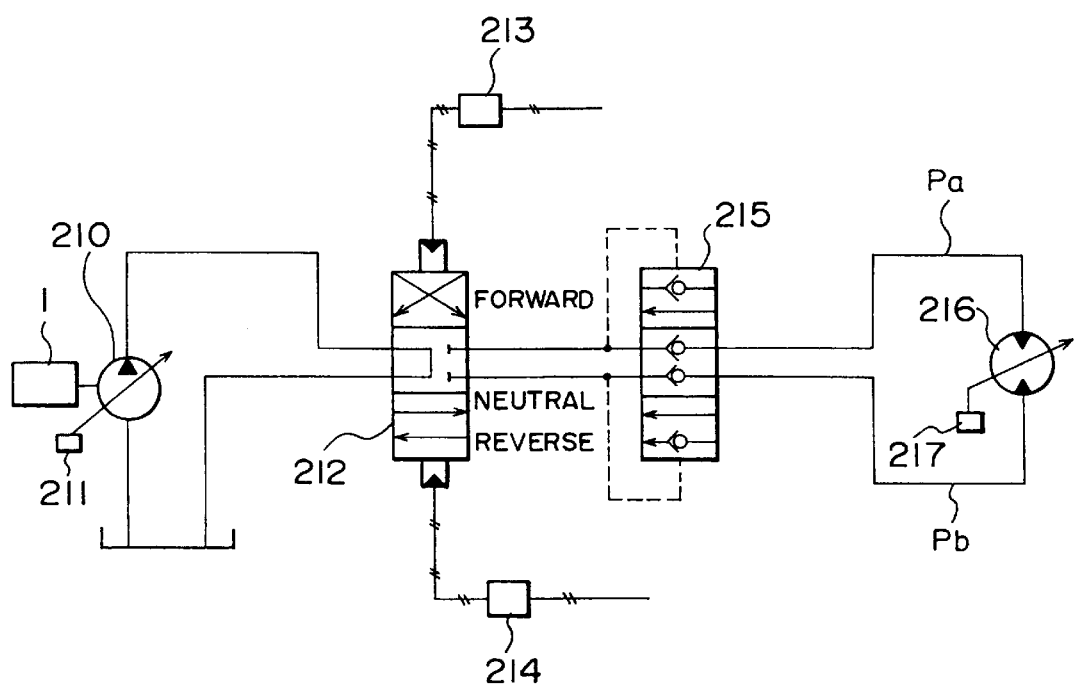
FIG. 14 illustrates a main part construction of a speed changing device for a hydraulic driving apparatus using a counterbalance valve according to a prior art.
Figure 15A:
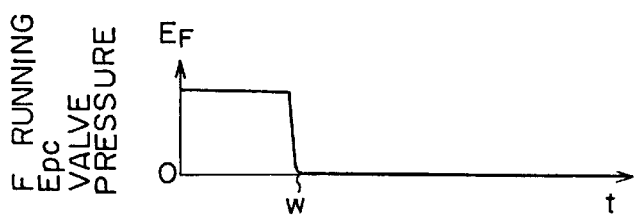
Figure 15B:
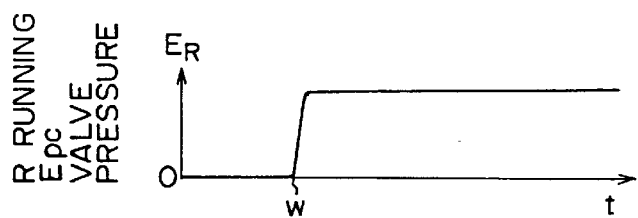
Figure 15C:
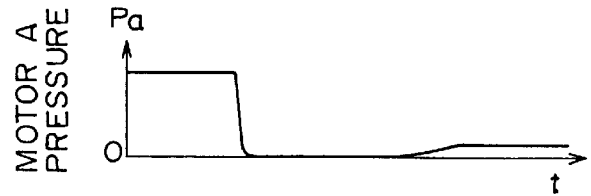
Figure 15D:
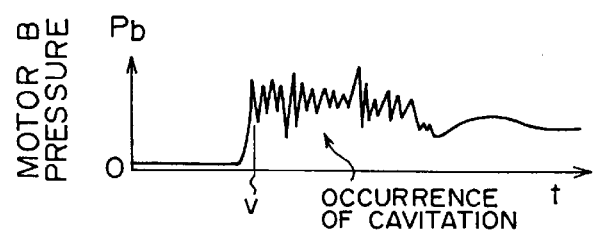
Figure 15E:
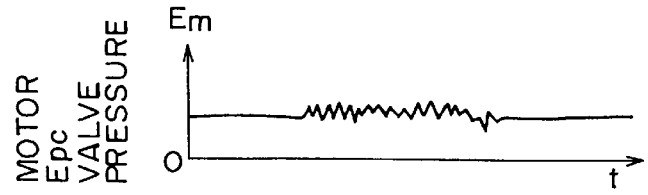
Figure 15F:
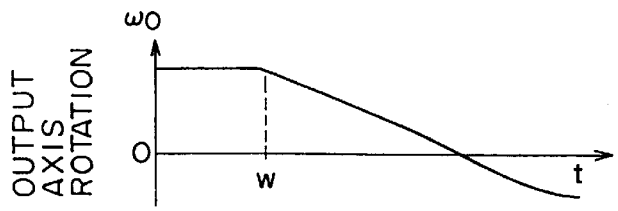

Operations of such a construction are shown in the flowcharts of FIGS. 13 and 9. In this embodiment, steps relating to the clutches have been omitted, more specifically, steps 334 and 335 have been omitted with respect to FIGS. 8 and 9 of the second embodiment, and a detailed explanation has been omitted. In this embodiment, the gear of the speed stage lever is engaged even if no clutch is provided and a shift is at the neutral position. Thus, even if the shifter 68 stops at the neutral position to cause coasting of the vehicle, the hydraulic motor 50 rotates at all times. This enables inlet/outlet pressures of the hydraulic motor 50 to be measured and judged at all times, so that steps 334 and 335 can be omitted.

INDUSTRIAL APPLICABILITY

The present invention is useful as a speed changer of a hydraulic driving device and a speed change control method thereof, which enables smooth start and speed change without causing cavitation, by separately controlling in braking and in power traveling, and which can improve operability, traveling efficiency, and reliability of hydraulic equipment.

We claim:

1. In a hydraulic driving apparatus for a machine including:
   - a hydraulic pump driven by a driving source,
   - a variable displacement hydraulic motor for receiving pressurized oil from the hydraulic pump to output a driving force,
   - a shift lever for selecting between forward operation of the hydraulic motor in a forward direction and reverse operation of the hydraulic motor in a reverse direction,
   - an oil tank,
   - a closed center directional control valve provided between the hydraulic pump and the hydraulic motor for switching said hydraulic motor between forward operation and reverse operation,
   - a first pipe for passing pressurized oil from the directional control valve to the hydraulic motor when the hydraulic motor is to be operated in the forward direction and for passing return oil from the hydraulic motor to the directional control valve when the hydraulic motor is to be operated in the reverse direction, and
   - a second pipe for passing pressurized oil from the directional control valve to the hydraulic motor when the hydraulic motor is to be operated in the reverse direction and for passing return oil from the hydraulic motor to the directional control valve when the hydraulic motor is to be operated in the forward direction;

the improvement comprising:
   - a shifter selected position sensor for detecting a change in a selection by the shift lever;
   - a motor rotational speed sensor, for detecting a rotational speed of said hydraulic motor;
   - a staged back pressure valve having an outlet connected to the oil tank;
   - a return circuit formed between said directional control valve and the staged back pressure valve, said staged back pressure valve being adapted to control a return pressure of return oil in the return circuit at any one of at least two different pressures;
   - first and second check valves, each of said check valves having a first side and a second side, the first side of said first check valve being connected to the first pipe between said directional control valve and said hydraulic motor, the first side of said second check valve being connected to the second pipe between said directional control valve and said hydraulic motor, and the second side of each of said check valves being connected between said directional control valve and said staged back pressure valve by said return circuit, so that when the first check valve is opened during switching to a forward operation, return oil can flow from the second pipe through the first check valve and the first pipe to the hydraulic motor, and when the second check valve is opened during switching to a reverse operation, return oil can flow from the first pipe through the second check valve and the second pipe to the hydraulic motor; and
   - a control device;

wherein said control device, upon detection of a change in the selection of said shift lever to a forward operation or to a reverse operation while the detected motor rotational speed is lower than a minimum desirable motor rotational speed, drives said machine with the driving force of said hydraulic motor, and wherein said control device, upon detection of a change in the selection of said shift lever to a forward operation or to a reverse operation while the detected motor rotational speed lies between said minimum desirable motor rotational speed and a maximum desirable motor rotational speed, outputs:
   - a signal for reducing an opening degree of said directional control valve,
   - a signal for allowing said staged back pressure valve to have a predetermined high back pressure so as to feed return oil from a discharge side of said hydraulic motor to a supply side of said hydraulic motor through one of said check valves, and
   - a signal for allowing said hydraulic motor to have a predetermined minimum discharge capacity to reduce the rotational speed of said hydraulic motor.

2. Apparatus in accordance with claim 1, wherein said staged back pressure valve is adapted to control a return pressure in the return circuit at either of a high pressure value and a low pressure value, such that at the low pressure value each of the first and second check valves is closed so that return oil is passed from the hydraulic motor to the oil tank, and such that at the high pressure value one of the first and second check valves is opened to pass a portion of the return oil from the hydraulic motor through the opened check valve to the one of the first and second pipes which is passing pressurized oil to the hydraulic motor.

3. Apparatus in accordance with claim 1, wherein said control device outputs a signal for providing a braking by said hydraulic motor when a pressure on the hydraulic motor is larger than a threshold value of a braking pressure.

4. In a hydraulic driving apparatus for a vehicle, said apparatus including:
   - a hydraulic pump driven by a driving source,
   - a variable displacement hydraulic motor for receiving pressurized oil from the hydraulic pump to output a driving force,
   - a shift lever for selecting between forward operation of the hydraulic motor in a forward direction and reverse operation of the hydraulic motor in a reverse direction,
   - an oil tank,
   - a closed center directional control valve provided between the hydraulic pump and the hydraulic motor for switching between forward operation and reverse operation,
   - a first pipe for passing pressurized oil from the directional control valve to the hydraulic motor when the hydraulic motor is to be operated in the forward direction and for passing return oil from the hydraulic motor to the directional control valve when the hydraulic motor is to be operated in the reverse direction, and
   - a second pipe for passing pressurized oil from the directional control valve to the hydraulic motor when the hydraulic motor is to be operated in the reverse direction and for passing return oil from the hydraulic motor to the directional control valve when the hydraulic motor is to be operated in the forward direction;

the improvement comprising:
   - a mode selection switch for selecting between a traveling mode position for traveling said vehicle and an operation mode position for operating a machine on said vehicle,
   - a mode detection sensor for detecting which one of the traveling mode position and the operation mode position has been selected by said mode selection switch;

a motor rotational speed sensor for detecting a rotational speed of said hydraulic motor;

a staged back pressure valve having an outlet connected to the oil tank;

a return circuit formed between said directional control valve and said staged back pressure valve, said staged back pressure valve being adapted to control a return pressure in the return circuit at any one of at least two different pressures;

first and second check valves, each of said check valves having a first side and a second side, the first side of said first check valve being connected to the first pipe between said directional control valve and said hydraulic motor, the first side of said second check valve being connected to the second pipe between said directional control valve and said hydraulic motor, and the second side of each of said check valves being connected between said directional control valve and said staged back pressure valve by said return circuit so that when the first check valve is opened during switching to a forward operation, return oil can flow from the second pipe through the first check valve and the first pipe to the hydraulic motor, and when the second check valve is opened during switching to a reverse operation, return oil can flow from the first pipe through the second check valve and the second pipe to the hydraulic motor; and a control device;

wherein, when the detected motor rotational speed lies between a minimum desirable motor rotational speed and a maximum desirable motor rotational speed, said control device, based on the selected position of said mode detection switch, outputs:

a signal for allowing said hydraulic motor to have a predetermined minimum discharge capacity, a signal for reducing an opening degree of said directional control valve, and a signal for allowing said staged back pressure valve to have a predetermined high back pressure so as to feed the return oil from a discharge side of said hydraulic motor to a supply side of said hydraulic motor through one of said check valves, and wherein, when a pressure applied on said hydraulic motor is larger than a threshold value of braking pressure, said control device further outputs a signal for providing the hydraulic motor with a predetermined motor capacity corresponding to the detected selected position of the mode detection switch.

5. Apparatus in accordance with claim 4, wherein said staged back pressure valve is adapted to control a return pressure in the return circuit at either of a high pressure value and a low pressure value, such that at the low pressure value each of the first and second check valves is closed so that return oil is passed from the hydraulic motor to the oil tank, and such that at the high pressure value one of the first and second check valves is opened to pass a portion of the return oil from the hydraulic motor through the opened check valve to the one of the first and second pipes which is passing pressurized oil to the hydraulic motor.

6. In a hydraulic driving apparatus for a vehicle having tires, the apparatus including:

a hydraulic pump driven by a driving source, a variable displacement hydraulic motor for receiving pressurized oil from the hydraulic pump to output a driving force, a shift lever for selecting between forward operation of the hydraulic motor in a forward direction and reverse operation of the hydraulic motor in a reverse direction, an oil tank, a closed center directional control valve provided between the hydraulic pump and the hydraulic motor for switching said hydraulic motor between forward operation and reverse operation, a first pipe for passing pressurized oil from the directional control valve to the hydraulic motor when the hydraulic motor is to be operated in the forward direction and for passing return oil from the hydraulic motor to the directional control valve when the hydraulic motor is to be operated in the reverse direction, and a second pipe for passing pressurized oil from the directional control valve to the hydraulic motor when the hydraulic motor is to be operated in the reverse direction and for passing return oil from the hydraulic motor to the directional control valve when the hydraulic motor is to be operated in the forward direction;

the improvement comprising:

an auxiliary transmission connected between an output shaft of said hydraulic motor and the tires of the vehicle, said auxiliary transmission having a first clutch and a second clutch for interrupting torque and for driving the tires at a variable speed of rotation;

a shifter selected position sensor for detecting a change of the selected position of said shift lever;

a motor rotational speed sensor for detecting a rotational speed of said hydraulic motor;

a staged back pressure valve having an outlet connected to the oil tank;

a return circuit formed between said directional control valve and the staged back pressure valve, said staged back pressure valve being adapted to control a return pressure of return oil in the return circuit at any one of at least two different pressures;

first and second check valves, each of said check valves having a first side and a second side, the first side of said first check valve being connected to the first pipe between said directional control valve and said hydraulic motor, the first side of said second check valve being connected to the second pipe between said directional control valve and said hydraulic motor, and the second side of each of said check valves being connected between said directional control valve and said staged back pressure valve by said return circuit, so that when the first check valve is opened during switching to a forward operation, return oil can flow from the second pipe through the first check valve and the first pipe to the hydraulic motor, and when the second check valve is opened during switching to a reverse operation, return oil can flow from the first pipe through the second check valve and the second pipe to the hydraulic motor; and a control device;

wherein said control device outputs a signal for engaging one of said first and second clutches in order to measure inlet/outlet pressure of said hydraulic motor while said hydraulic motor is being rotated by a coasting of the vehicle when (a) a change in the selected position of said shift lever is detected and (b) said detected motor rotational speed lies between a minimum desirable motor rotational speed and a maximum desirable motor rotational speed.

7. Apparatus in accordance with claim 6, wherein said staged back pressure valve is adapted to control a return pressure in the return circuit at either of a high pressure value and a low pressure value, such that at the low pressure value each of the first and second check valves is closed so that return oil is passed from the hydraulic motor to the oil tank, and such that at the high pressure value one of the first and second check valves is opened to pass a portion of the return oil from the hydraulic motor through the opened check valve to the one of the first and second pipes which is passing pressurized oil to the hydraulic motor.

8. Apparatus in accordance with claim 6, wherein said control device, upon detection of a change in the selection of said shift lever to a forward operation or to a reverse operation while the detected motor rotational speed lies between said minimum desirable motor rotational speed and a maximum desirable motor rotational speed, outputs:

a signal for reducing an opening degree of said directional control valve, a signal for allowing said staged back pressure valve to have a predetermined high back pressure so as to feed return oil from a discharge side of said hydraulic motor to a supply side of said hydraulic motor through one of said check valves, and a signal for allowing said hydraulic motor to have a predetermined minimum discharge capacity to reduce the rotational speed of said hydraulic motor.

9. Apparatus in accordance with claim 6, wherein said control device outputs a signal for providing a braking by said hydraulic motor when a pressure on the hydraulic motor is larger than a threshold value of a braking pressure.

10. In a method of operating a hydraulic driving apparatus, wherein pressurized oil from a hydraulic pump is supplied to a hydraulic motor through a directional control valve, and wherein the directional control valve is actuated responsive to a change in a position of a shift lever having a forward operation position and a reverse operation position, so as to switch between a forward operation of the hydraulic motor and a reverse operation of the hydraulic motor, the improvement comprising the steps of:

switching said directional control valve to a neutral position when there is a change in the position of said shift lever;

after an elapse of a fixed period of time from the switching of the directional control valve to the neutral position, measuring an inlet pressure of said hydraulic motor and an outlet pressure of said hydraulic motor;

comparing the thus measured inlet pressure and the thus measured outlet pressure to determine whether the hydraulic motor is operating in the forward direction or in the reverse direction;

detecting the position of the shift lever; and reducing a rotational speed of said hydraulic motor when (a) either of the measured inlet pressure and the measured outlet pressure is larger than a brake threshold value, and (b) the direction selected by said shift lever does not match the direction determined by the step of comparing the measured inlet pressure and the measured outlet pressure.

11. A method in accordance with claim 10, wherein at least one clutch is secured to an output shaft of said hydraulic motor for interrupting torque, and wherein the step of measuring an inlet pressure and an outlet pressure is performed with at least one, of the at least one clutch, engaged.

12. In a method of operating a hydraulic driving apparatus, wherein pressurized oil from a hydraulic pump is supplied to a hydraulic motor through a directional control valve, and wherein the directional control valve is actuated responsive to a change in a position of a shift lever, having a forward operation position and a reverse operation position, so as to switch between a forward operation of the hydraulic motor and a reverse operation of the hydraulic motor, the improvement comprising the steps of:

detecting a change in the position selected by the shift lever;

determining a rotational speed of the rotational motor;

when the thus determined rotational speed is between a minimum desirable motor rotational speed and a maximum desirable motor rotational speed, reducing rotational speed of said hydraulic motor upon a detection of a change in the position selected by the shift lever;

preventing occurrence of cavitation, during the step of reducing rotational speed of said hydraulic motor, by:
reducing a discharge capacity of said hydraulic motor,
reducing an opening degree of said directional control valve to generate braking force of said hydraulic motor, and
feeding a portion of return oil from a discharge side of said hydraulic motor to a supply side of said hydraulic motor in order to increase supply of oil to said hydraulic motor.

13. A method in accordance with claim 12, wherein when the thus determined rotational speed is greater than a desired maximum rotational speed, the steps of reducing rotational speed and preventing occurrence of cavitation are delayed until the thus determined rotational speed is not greater than the desired maximum rotational speed.

* * * * *

UNITED STATES PATENT AND TRADEMARK OFFICE
CERTIFICATE OF CORRECTION

PATENT NO. : 6,182,448 B1
DATED : February 6, 2001
INVENTOR(S) : Yasunori Ohkura et al.

It is certified that error appears in the above-identified patent and that said Letters Patent is hereby corrected as shown below:

Title page,
Delete the exemplary figure and insert:

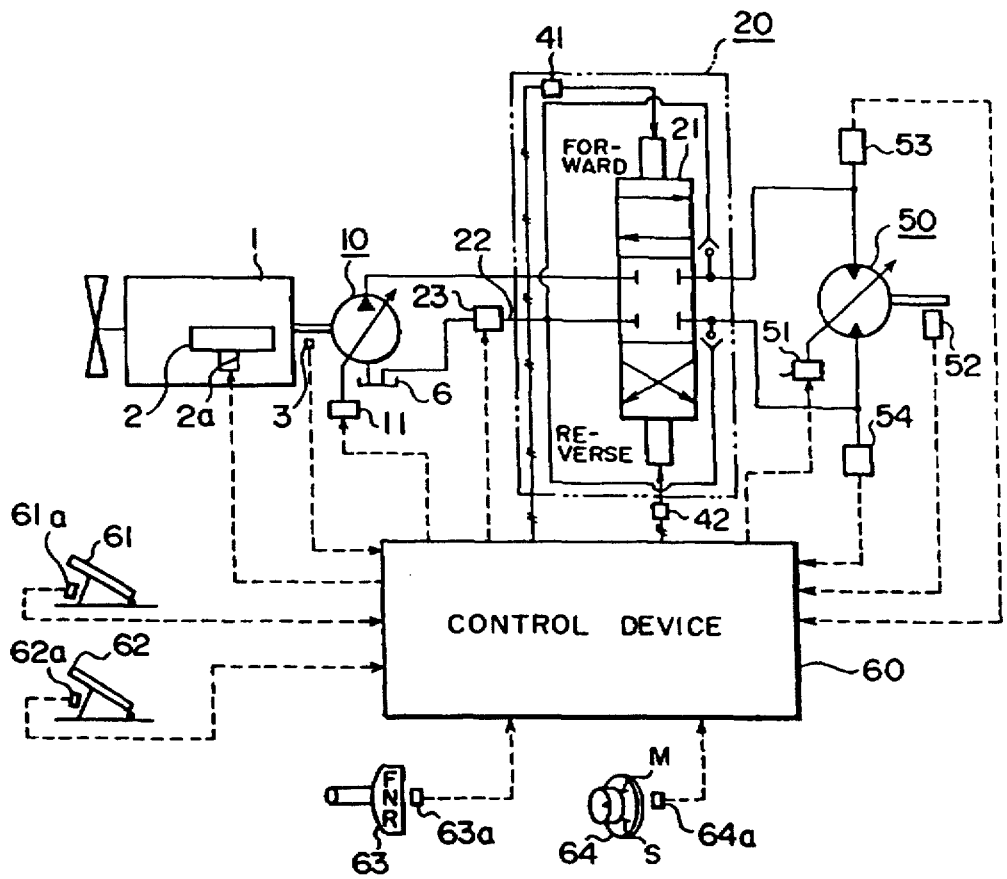

UNITED STATES PATENT AND TRADEMARK OFFICE
CERTIFICATE OF CORRECTION

PATENT NO.   : 6,182,448 B1
DATED        : February 6, 2001
INVENTOR(S)  : Yasunori Ohkura et al.

Page 2 of 2

It is certified that error appears in the above-identified patent and that said Letters Patent is hereby corrected as shown below:

Delete Fig. 1 in its entirety and insert the following:

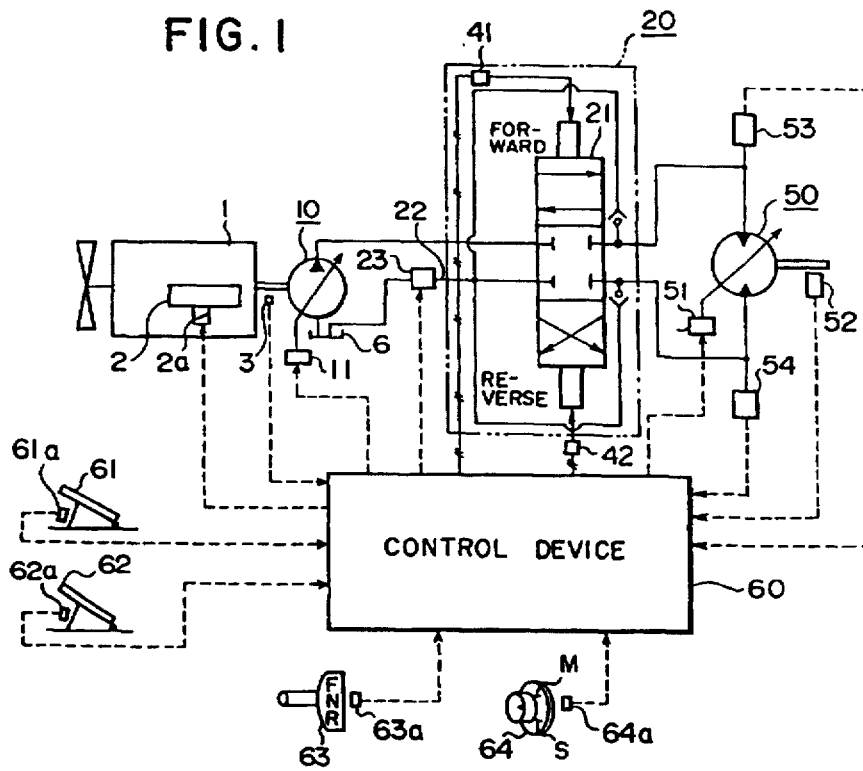

Signed and Sealed this

Sixth Day of November, 2001

Attest:

*Nicholas P. Godici*

NICHOLAS P. GODICI
*Attesting Officer*   Acting Director of the United States Patent and Trademark Office